(12) United States Patent
Monk

(10) Patent No.: US 8,280,309 B2
(45) Date of Patent: *Oct. 2, 2012

(54) SOFT HANDOFF METHOD AND APPARATUS FOR MOBILE VEHICLES USING DIRECTIONAL ANTENNAS

(75) Inventor: Anthony D Monk, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1724 days.

This patent is subject to a terminal disclaimer.

(21) Appl. No.: 11/314,640

(22) Filed: Dec. 21, 2005

(65) Prior Publication Data

US 2006/0229077 A1 Oct. 12, 2006

Related U.S. Application Data

(63) Continuation-in-part of application No. 11/184,712, filed on Jul. 19, 2005, now abandoned.

(51) Int. Cl.
*H04B 1/00* (2006.01)
*H04B 15/00* (2006.01)

(52) U.S. Cl. .......... 455/63.4; 455/19; 455/25; 455/436; 455/442; 455/562.1; 370/328; 370/329; 370/330; 370/331

(58) Field of Classification Search .............. 455/562.1, 455/431, 12.1, 13.1, 13.2, 13.3, 19, 25, 63.4, 455/101, 442, 436–438; 343/705; 342/368, 342/165, 174, 359, 357.08, 357.11, 357.14; 370/334, 336, 344, 345, 328–331

See application file for complete search history.

(56) References Cited

U.S. PATENT DOCUMENTS

| 4,259,674 A | | 3/1981 | Dragone et al. |
| 4,682,128 A | * | 7/1987 | Sproul et al. .................. 333/139 |
| 5,123,112 A | | 6/1992 | Choate |
| 5,212,804 A | | 5/1993 | Choate |
| 5,287,330 A | * | 2/1994 | Gilmour ....................... 367/103 |
| 5,444,762 A | | 8/1995 | Frey et al. |

(Continued)

FOREIGN PATENT DOCUMENTS

GB 2344211 5/2000

(Continued)

*Primary Examiner* — Olumide T Ajibade Akonai
(74) *Attorney, Agent, or Firm* — Harness, Dickey & Pierce, P.L.C.

(57) ABSTRACT

A system and method for implementing soft handoffs in a communications system on a mobile platform. The system employs an antenna controller in communication with a beam forming network that generates two independently aimable lobes from a single beam. The single beam is radiated by a phased array antenna on the mobile platform. In an Air-to-Ground implementation involving an aircraft, a base transceiver station (BTS) look-up position table is utilized to provide the locations of a plurality of BTS sites within a given region that the aircraft is traversing. The antenna controller controls the beam forming network to generate dual lobes from the single beam that facilitate making a soft handoff from one BTS site to another. In a ground-based application, one lobe of the beam is used to maintain a communications link with one BTS site while a second lobe of the beam is continuously scanned about a predetermined arc to receive RF signals from other BTS sites and to determine when a new BTS site has become available that will provide a higher quality link than the link presently made with the one BTS site. A soft handoff is then implemented from the one BTS site to the new BTS site.

28 Claims, 19 Drawing Sheets

U.S. PATENT DOCUMENTS

| | | | |
|---|---|---|---|
| 5,503,350 A * | 4/1996 | Foote | 244/1 R |
| 6,047,165 A | 4/2000 | Wright et al. | |
| 6,107,974 A * | 8/2000 | Votruba et al. | 343/787 |
| 6,148,179 A | 11/2000 | Wright et al. | |
| 6,154,637 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,253,064 B1 | 6/2001 | Monroe | |
| 6,285,878 B1 | 9/2001 | Lai | |
| 6,288,670 B1 * | 9/2001 | Villani et al. | 342/354 |
| 6,353,734 B1 | 3/2002 | Wright et al. | |
| 6,392,692 B1 | 5/2002 | Monroe | |
| 6,522,867 B1 | 2/2003 | Wright et al. | |
| 6,529,706 B1 | 3/2003 | Mitchell | |
| 6,580,915 B1 | 6/2003 | Kroll | |
| 6,608,591 B2 * | 8/2003 | Wastberg | 342/373 |
| 6,642,894 B1 | 11/2003 | Gross et al. | |
| 6,650,897 B2 | 11/2003 | Nelson | |
| 6,680,924 B2 | 1/2004 | Hills et al. | |
| 6,693,588 B1 | 2/2004 | Schlee | |
| 6,725,035 B2 | 4/2004 | Jochim et al. | |
| 6,745,010 B2 | 6/2004 | Wright et al. | |
| 6,754,489 B1 | 6/2004 | Roux | |
| 6,760,778 B1 | 7/2004 | Nelson et al. | |
| 6,801,764 B2 | 10/2004 | Purpura | |
| 6,801,769 B1 | 10/2004 | Royalty | |
| 6,907,271 B2 * | 6/2005 | Senarath et al. | 455/562.1 |
| 7,009,557 B2 * | 3/2006 | Kirchofer et al. | 342/359 |
| 7,027,769 B1 * | 4/2006 | Rosen et al. | 455/11.1 |
| 7,046,978 B2 * | 5/2006 | Burke et al. | 455/272 |
| 7,072,692 B1 * | 7/2006 | Katz et al. | 455/562.1 |
| 7,317,916 B1 * | 1/2008 | Chang et al. | 455/430 |
| 2002/0019229 A1 | 2/2002 | Usher et al. | |
| 2002/0075825 A1 | 6/2002 | Hills et al. | |
| 2002/0082008 A1 | 6/2002 | Nelson | |
| 2002/0137538 A1 * | 9/2002 | Chen et al. | 455/550 |
| 2002/0160773 A1 | 10/2002 | Gresham et al. | |
| 2002/0197990 A1 | 12/2002 | Jochim et al. | |
| 2003/0003872 A1 | 1/2003 | Brinkley et al. | |
| 2003/0008652 A1 | 1/2003 | Jochim et al. | |
| 2003/0064704 A1 | 4/2003 | Purpura | |
| 2003/0069015 A1 | 4/2003 | Brinkley et al. | |
| 2004/0102188 A1 | 5/2004 | Boyer et al. | |
| 2004/0162067 A1 | 8/2004 | Stefani et al. | |
| 2004/0180653 A1 | 9/2004 | Royalty | |
| 2004/0192188 A1 | 9/2004 | Dieudonne | |
| 2004/0198346 A1 | 10/2004 | Swensen et al. | |
| 2004/0198347 A1 | 10/2004 | Roux et al. | |
| 2004/0224637 A1 * | 11/2004 | Silva et al. | 455/63.4 |
| 2006/0223573 A1 * | 10/2006 | Jalali | 455/552.1 |

FOREIGN PATENT DOCUMENTS

| | | |
|---|---|---|
| WO | WO 0076087 | 12/2000 |
| WO | WO 2005/022683 | 3/2005 |

* cited by examiner

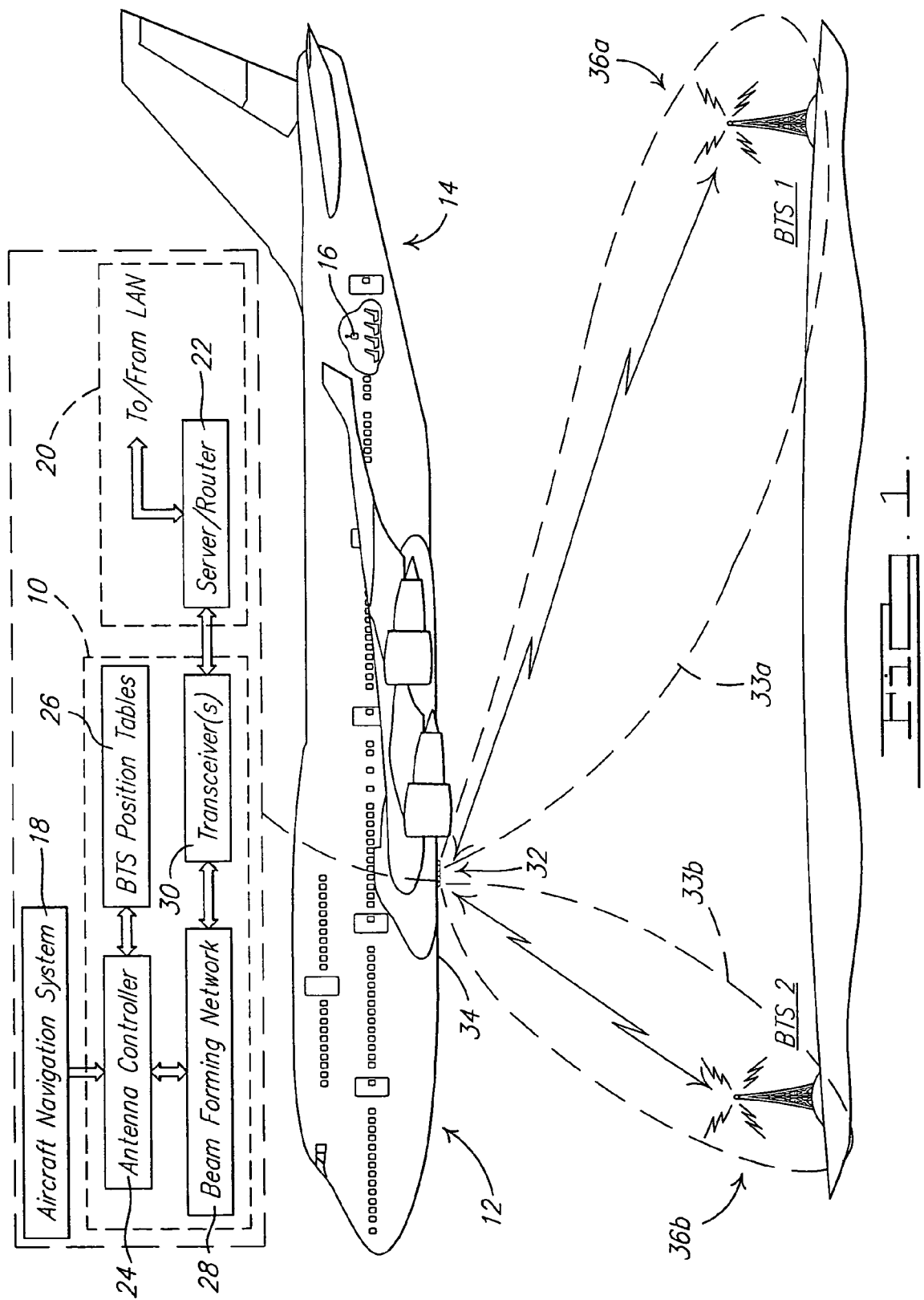

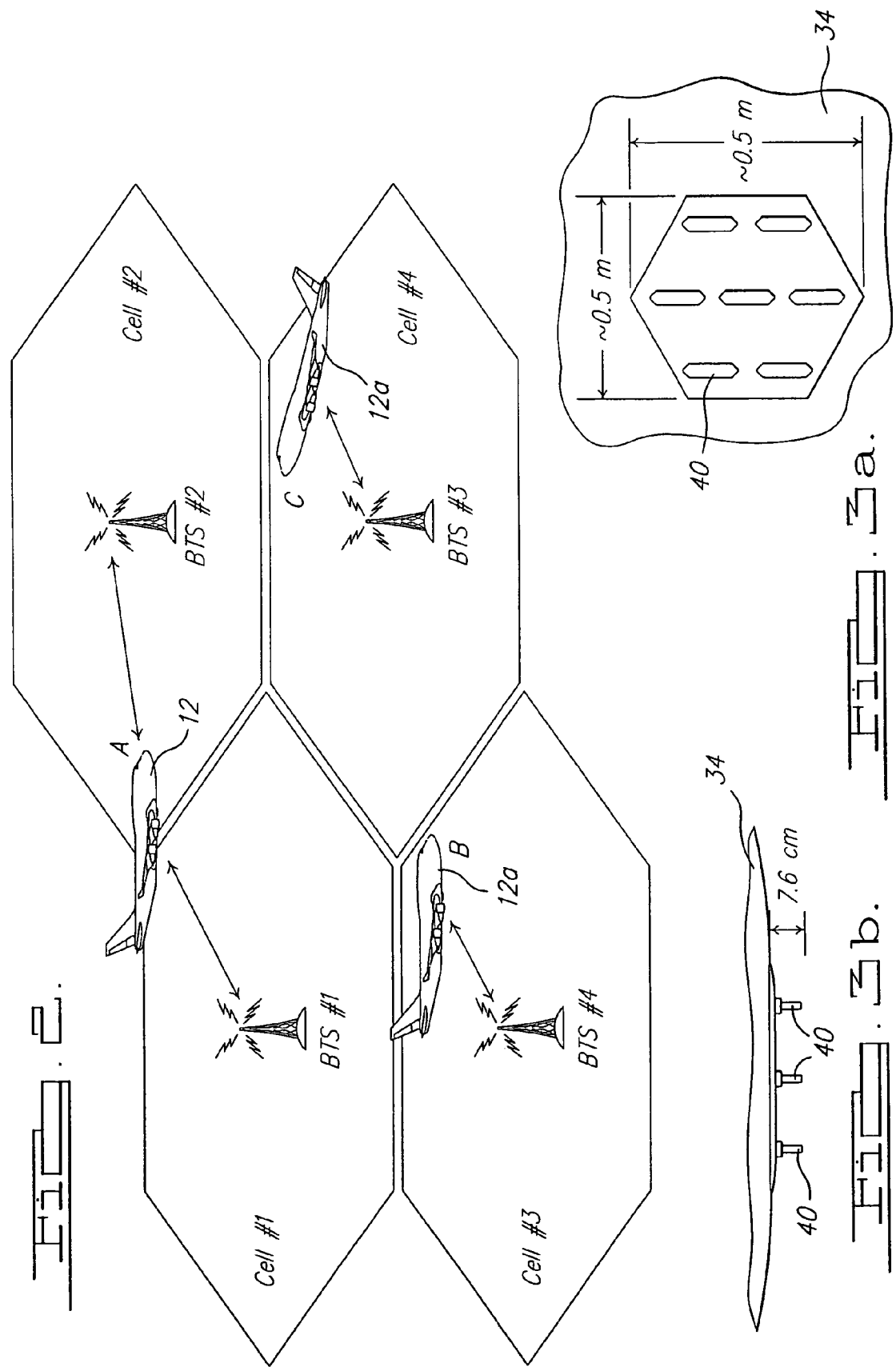

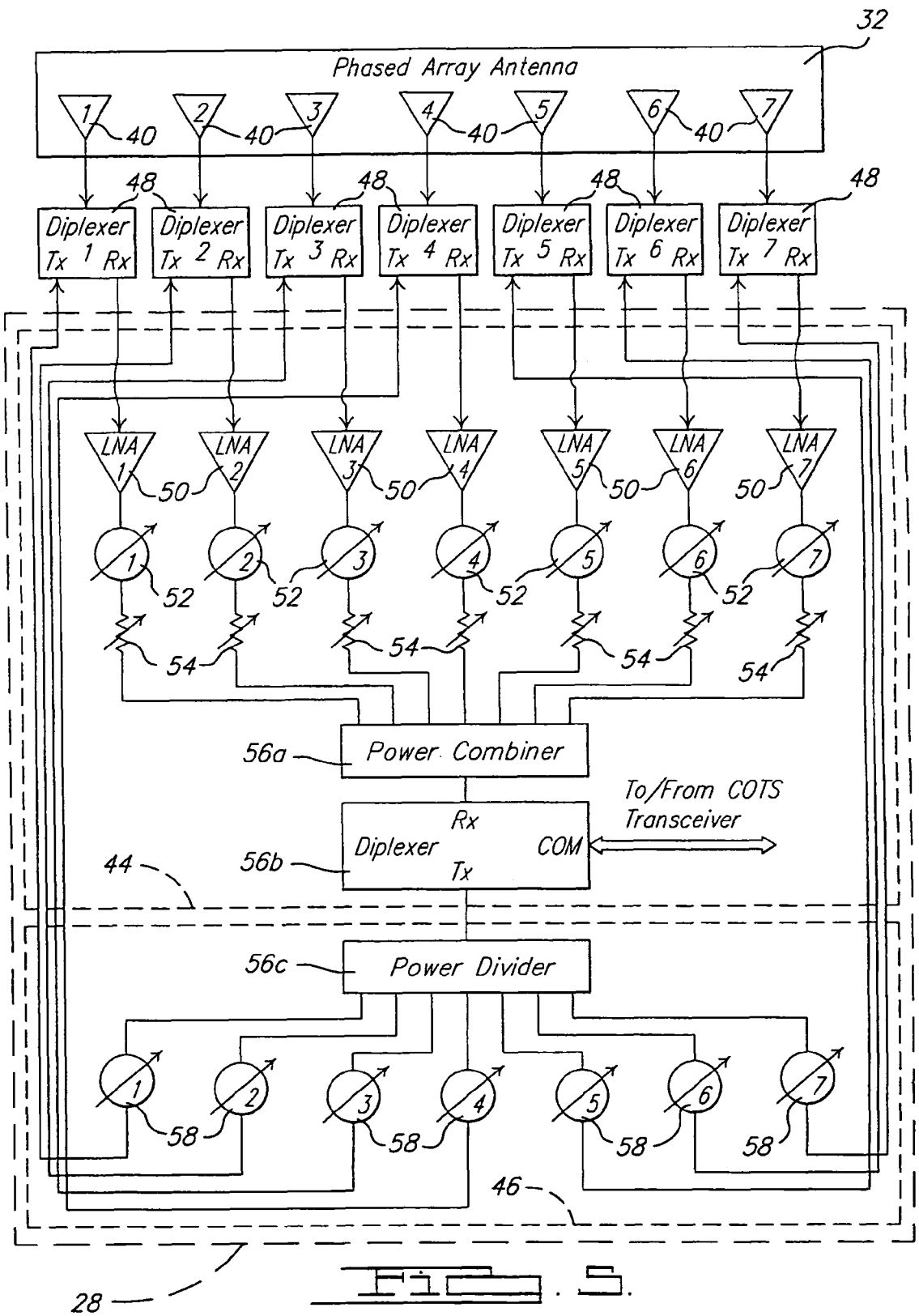

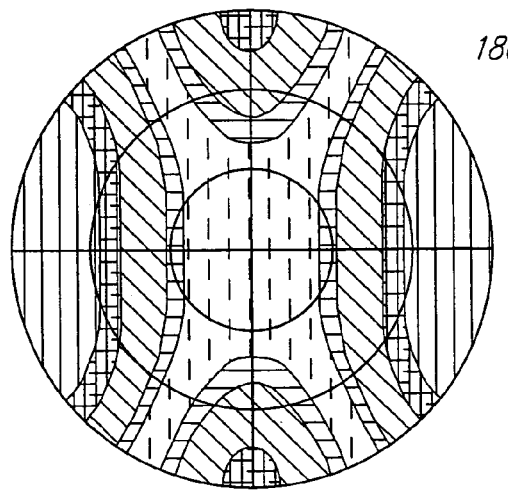
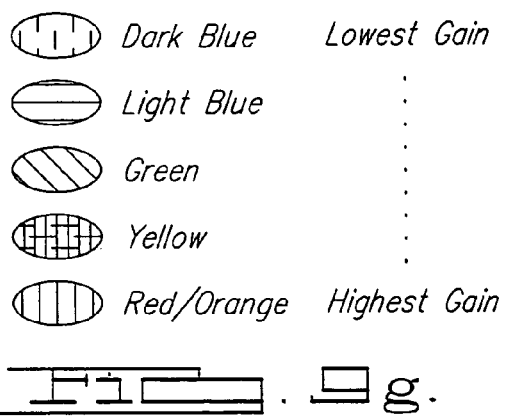
180° Separation
FIG. 9g.
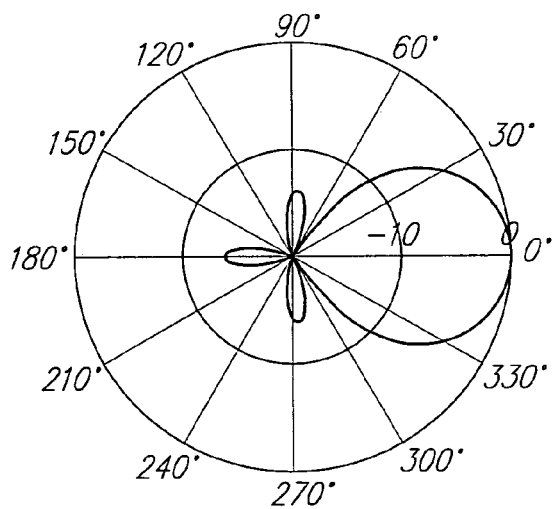
0° Separation
FIG. 10a.
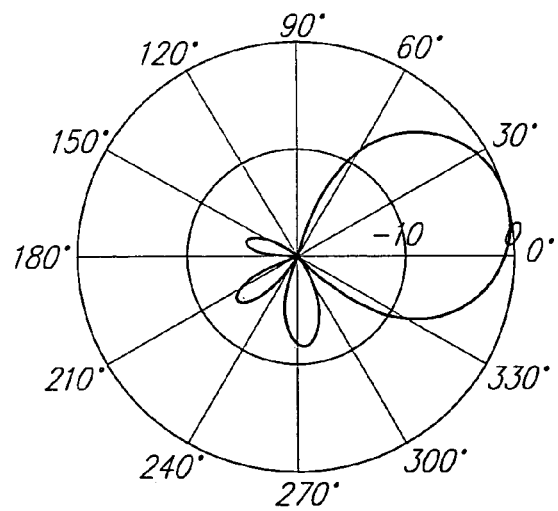
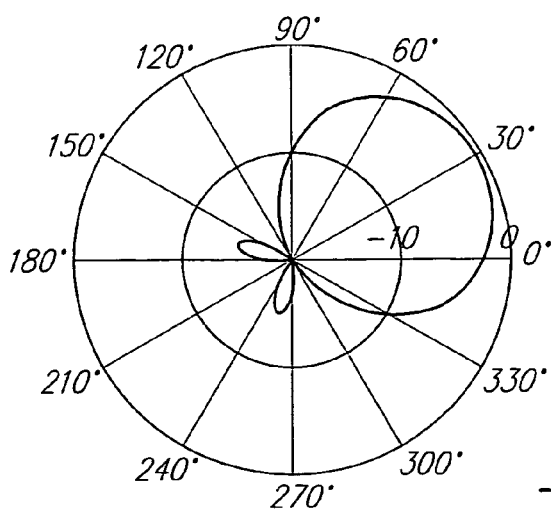
30° Separation
FIG. 10b.
60° Separation
FIG. 10c.

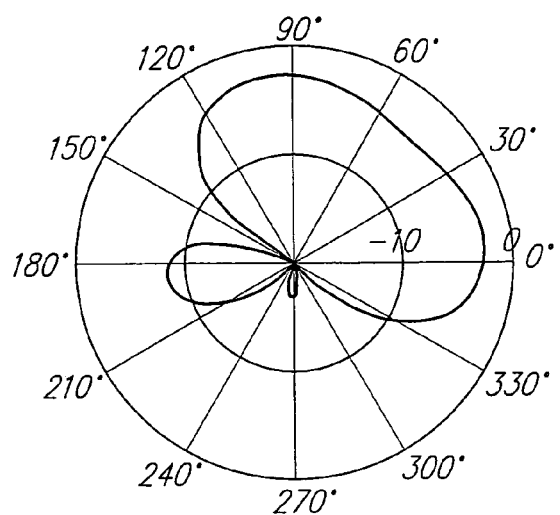
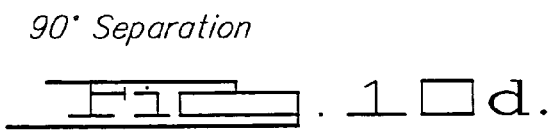
90° Separation
FIG. 10d.
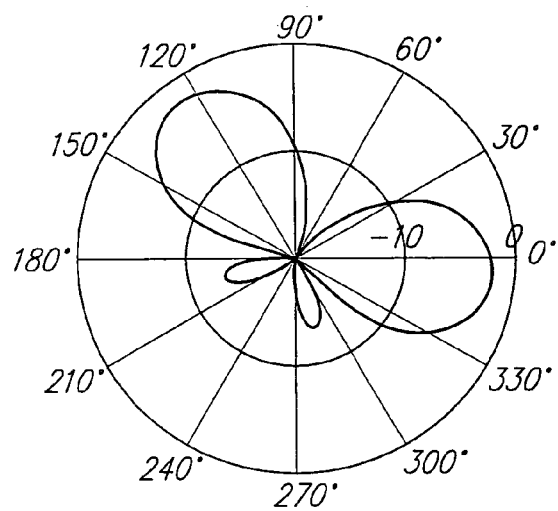
120° Separation
FIG. 10e.
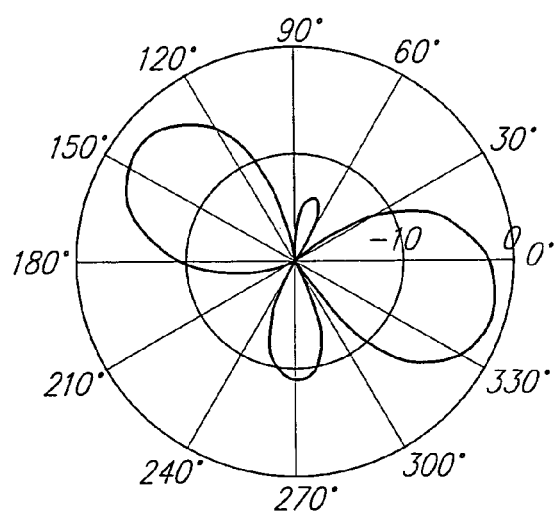
150° Separation
FIG. 10f.
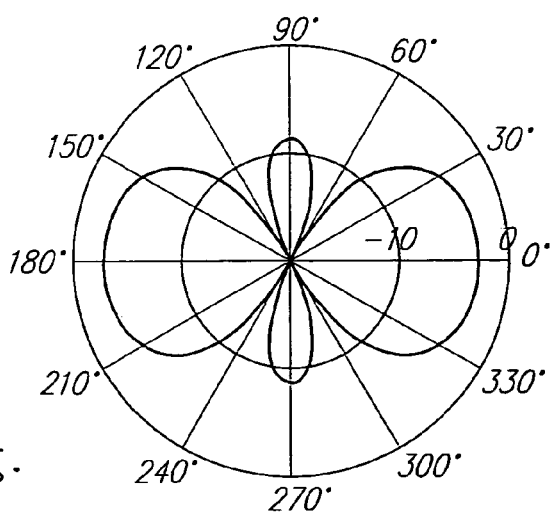
180° Separation
FIG. 10g.

α = 0

- Dark Blue — Lowest Gain
- Light Blue — ⋮
- Green — ⋮
- Yellow — ⋮
- Red/Orange — Highest Gain

α = 0.1

- Dark Blue — Lowest Gain
- Light Blue — ⋮
- Green — ⋮
- Yellow — ⋮
- Red/Orange — Highest Gain

α = 0.2

- Dark Blue — Lowest Gain
- Light Blue — ⋮
- Green — ⋮
- Yellow — ⋮
- Red/Orange — Highest Gain

α = 0.3

- Dark Blue — Lowest Gain
- Light Blue
- Green
- Yellow
- Red/Orange — Highest Gain

α = 0.4

- Dark Blue — Lowest Gain
- Light Blue
- Green
- Yellow
- Red/Orange — Highest Gain

α = 0.5

- Dark Blue — Lowest Gain
- Light Blue
- Green
- Yellow
- Red/Orange — Highest Gain $\alpha = 0.6$

- Dark Blue — Lowest Gain
- Light Blue
- Green
- Yellow
- Red/Orange — Highest Gain $\alpha = 0.7$

- Dark Blue — Lowest Gain
- Light Blue
- Green
- Yellow
- Red/Orange — Highest Gain $\alpha = 0.8$

- Dark Blue — Lowest Gain
- Light Blue
- Green
- Yellow
- Red/Orange — Highest Gain

α = 0.9

⬭ Dark Blue — Lowest Gain
⬭ Light Blue
⬭ Green
⬭ Yellow
⬭ Red/Orange — Highest Gain

α = 1

⬭ Dark Blue — Lowest Gain
⬭ Light Blue
⬭ Green
⬭ Yellow
⬭ Red/Orange — Highest Gain

α = 0

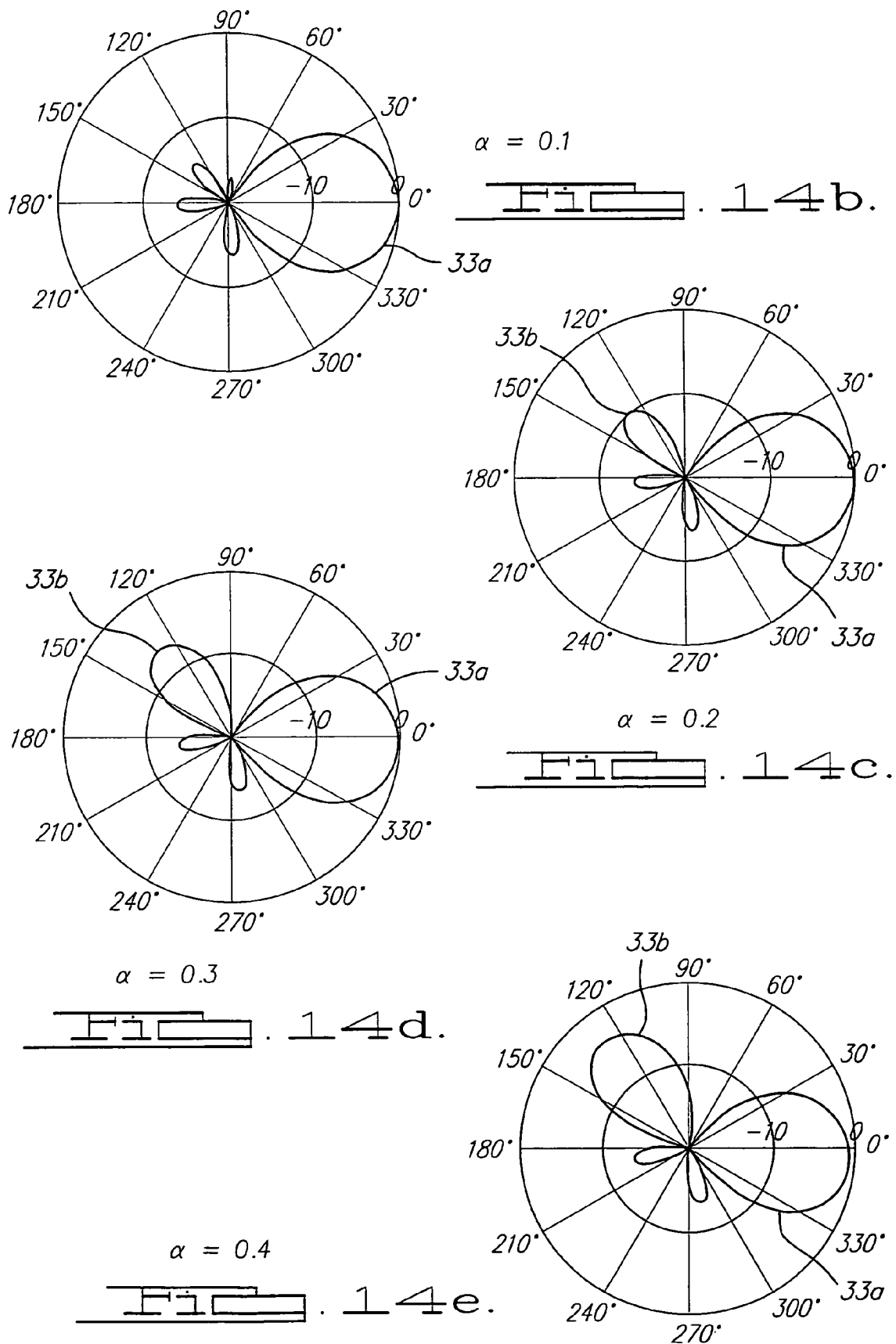

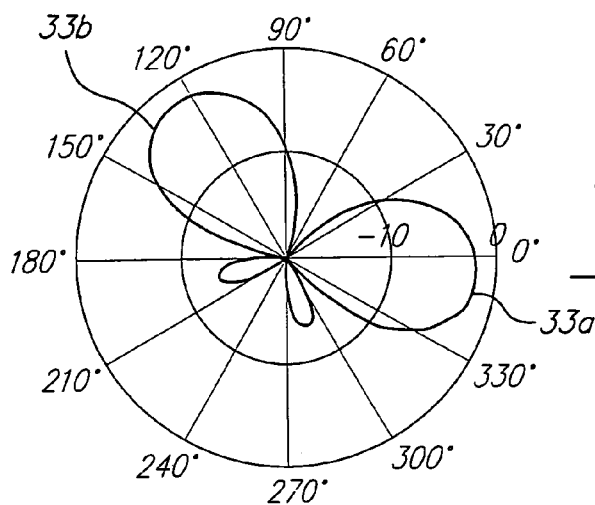
FIG. 14f. α = 0.5
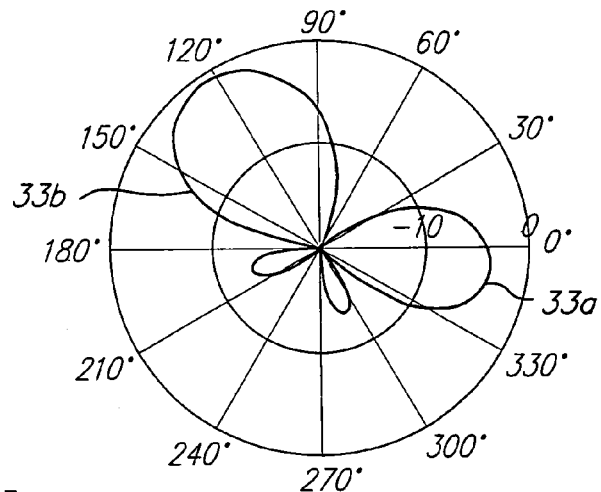
FIG. 14g. α = 0.6
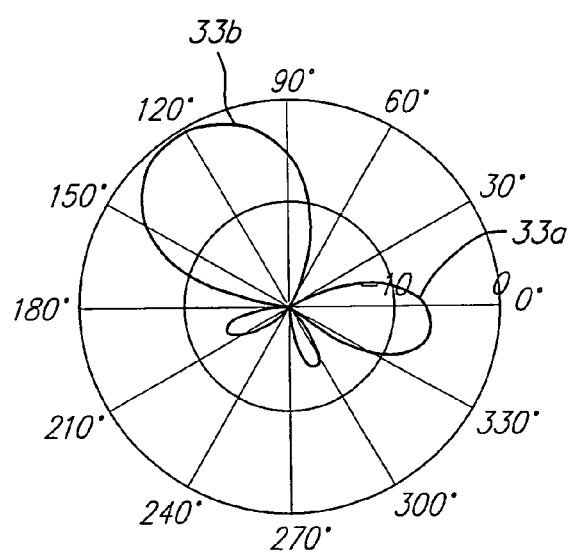
FIG. 14h. α = 0.7
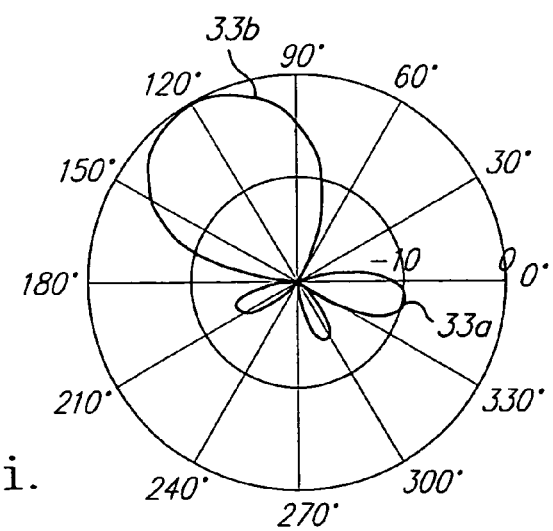
FIG. 14i. α = 0.8

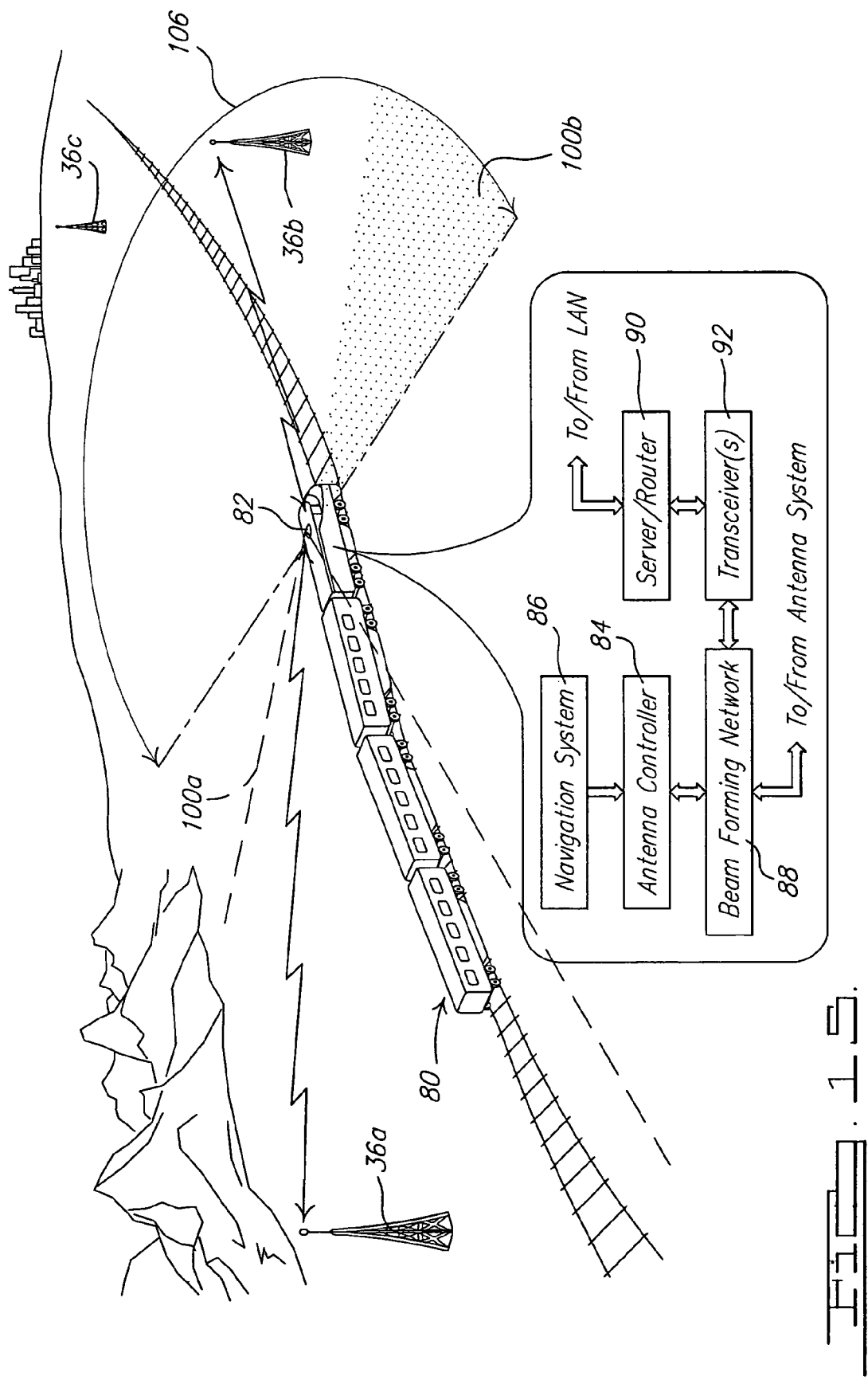

SOFT HANDOFF METHOD AND APPARATUS FOR MOBILE VEHICLES USING DIRECTIONAL ANTENNAS

CROSS-REFERENCE TO RELATED APPLICATIONS

The present application is a continuation-in-part of U.S. Ser. No. 11/184,764, filed Jul. 19, 2005 and presently pending, and in turn claims priority from U.S. Provisional Patent Application No. 60/669,950 filed on Apr. 8, 2005, and assigned to The Boeing Company. The disclosures of both of the above applications are incorporated herein by reference.

FIELD OF THE INVENTION

The present invention relates to air-to-ground communication systems, and more particularly to an air-to-ground communications system adapted for use with an airborne mobile platform that is able to accomplish soft hand offs between terrestrial base transceiver stations in a cellular network while the mobile platform is in flight.

BACKGROUND OF THE INVENTION

It would be highly desirable to provide an air-to-ground (ATG) communication service for providing broadband data, voice and entertainment to the commercial transport industry (e.g., commercial airlines) and general aviation markets in North America and around the world. It would be especially desirable to implement a new ATG network in a manner that is similar to presently existing terrestrial cellular (i.e., wireless) communication networks. This would allow taking advantage of the large amounts of capital that have already been invested in developing cellular technologies, standards and related equipment. The basic idea with a new air-to-ground service would be the same as with other wireless networks. That is, as aircraft fly across North America (or other regions of the world) they are handed off from one base transceiver station (BTS) to another BTS, just as terrestrial cellular networks hand off cellular devices (handsets, PDAs, etc.) when such devices are mobile.

One important difference is that ATG systems use one transceiver having an antenna mounted on the undercarriage of the aircraft to communicate with the terrestrial BTS. Presently, the Federal Communications Commission (FCC) has allocated only a single 1.25 MHz channel (in each direction) for ATG use. This creates a significant problem. There simply is insufficient communication capacity in a single ATG channel to provide broadband service to the expected market of 10,000 or more aircraft using the exact communication method and apparatus used for standard terrestrial cellular communication. For example, if one was to take a standard cell phone handset and project its omnidirectional radiation pattern outside the skin of the aircraft, and allowed the signals to communicate with the terrestrial cellular network, such a system would likely work in a satisfactory manner, but there would be insufficient capacity in such a network to support cellular users on 10,000 or more aircraft.

The above capacity problem comes about because a typical cell phone antenna is a monopole element that has an omnidirectional gain pattern in the plane perpendicular to the antenna element. This causes transmit power from the antenna to radiate in all directions, thus causing interference into all BTS sites within the radio horizon of its transmissions (a 250 mile (402.5 km) radius for aircraft flying at 35,000 ft (10,616 m) cruise altitude. All cellular networks, and especially those using code division multiple access (CDMA) technology, are limited in their communication capacity by the interference produced by the radiation from the mobile to cellular devices used to access the networks.

A well known method for reducing interference on wireless networks is using directional antennas instead of the omnidirectional antennas used on mobile cellular phones. Directional antennas transmit a directional beam from the mobile cellular phones towards the intended target (i.e., the serving BTS) and away from adjacent BTS sites. This method can increase the network capacity by several fold, but it is impractical for most personal cell phones because the directional antennas are typically physically large, and certainly not of a convenient size for individuals to carry and use on a handheld cellular phone. However, directional antennas can easily be accommodated on most mobile platforms (e.g., cars, trucks, boats, trains, buses, aircraft and rotorcraft).

Accordingly, a fundamental problem is how to implement commercial off-the-shelf (COTS) cellular technology, designed to operate with omnidirectional antennas, to function properly with directional antennas. A closely related technical problem is how to implement hand offs of mobile cellular phones between BTS sites using standard methods and protocols. In particular, the 3rd generation cellular standards (CDMA2000 and UMTS) both use a method called "soft handoff" to achieve reliable handoffs with very low probability of dropped calls. To be fully compatible with these standards, any new ATG service must support soft handoffs. A specific technical issue, however, is that performing a soft handoff requires that the mobile cellular terminal (i.e., cell phone) establishes communication with one BTS before breaking communication with another BTS. This is termed a "make before break" protocol. The use of a conventional antenna to look in only one direction at a time, however, presents problems in implementing a "make before break" soft handoff. Specifically, conventional directional antennas have only a single antenna beam or lobe. If the mobile platform, for example a commercial aircraft, wants to handoff from a BTS behind it (i.e., a BTS site that the aircraft has just flown past) in order to establish communication with another BTS that the aircraft is approaching, it must break the connection with the existing BTS before making a new connection with the new BTS that it is approaching (i.e., a "break before make" handoff). A "break before make" handoff is also known as a "hard handoff." As mentioned previously, this is not as reliable a handoff method as the "make before break" handoff, although it is used presently in second generation TDMA cellular systems, and is also used under unusual circumstances (e.g., channel handoff) in 3rd generation cellular systems.

Thus, in order to implement soft handoffs in an ATG system implemented with using a high speed mobile platform such as a commercial aircraft, the fundamental problem remaining is how to achieve soft handoffs using directional antennas.

SUMMARY OF THE INVENTION

The present invention is directed to an apparatus and method for implementing a wireless communication terminal on a mobile platform that makes use of directional antennas able to accomplish soft handoffs between base transceiver stations (BTSs) in a cellular network. The mobile communication terminal of the present invention can be mounted on any form of mobile platform (planes, trains, automobiles, buses, ships, aircraft, rotorcraft), but is especially well suited for use on high speed commercial aircraft used in commercial air transport and general aviation markets. The mobile wireless communication terminal of the present invention can be used to form a new broadband ATG network able to provide broadband data, voice and entertainment services to commercial aircraft.

The present invention also makes use of, and is fully compatible with, established wireless communication standards, for example 3rd generation cellular standards (CDMA2000 and UMTS). The mobile wireless communication system of the present invention further enables use of commercial off-the-shelf equipment and cellular standards to implement the new ATG communication system; thus, the system of the present invention eliminates the need to establish new protocols and/or standards that would otherwise add significant costs, delay in system implementation and roll-out, and complexity to implementing a new broadband ATG network on a high speed mobile platform.

In one preferred implementation the system and method of the present invention makes use of an aircraft radio terminal (ART). The ART includes an antenna controller that is in communication with aircraft navigation information (e.g., latitude, longitude, altitude, attitude). The antenna controller is also in communication with a look-up table that lists the various BTS sites within a given region that the aircraft is traveling (e.g., the Continental United States) and their locations and altitudes. The antenna controller controls a beam forming network that is used to modify a directional beam of a phased array antenna carried on the mobile platform. In one preferred form the phased array antenna is comprised of a plurality of monopole antenna blades secured to an undercarriage of the aircraft. The beam forming network is responsive to a local area network (LAN) system carried on the aircraft to enable two-way communication, via the antenna system, with users carrying cellular devices on the aircraft.

In one preferred implementation the directional antenna comprises a phased array antenna having a plurality of seven monopole blade antenna elements. The beam forming network controls the beam pattern of the phased array antenna system such that a single beam formed by the phased array system is controllably altered to provide either a single focused beam or a single beam having first and second lobes projecting in different directions. Thus, one lobe can be used to temporarily maintain communication with the first BTS while the second lobe establishes communication with a second BTS just prior to beginning a soft handoff. In a preferred implementation the beam forming network also controls the beam pattern of the phased array antenna such that a gradual transition occurs between single lobe and dual lobe beam patterns so that a connection with the first BTS can be faded out while the connection with the second BTS is fully made (i.e., "faded in"). By using the BTS position look-up table in connection with the navigation information, the antenna controller and the beam forming network are able to determine when a soft handoff is needed, and to begin making the soft handoff as the aircraft moves within range of the second BTS, as it leaves the covered region of the first BTS.

Thus, the system and method of the present invention is able to achieve a soft handoff between two BTS sites by using only a single beam from a directional antenna, but by controlling the formation of the single beam in such a manner that the beam effectively performs the function of two independent beams. This enables soft handoffs to be implemented through a phased array antenna and related beam forming equipment without the additional cost and complexity required if two independent beams were to be generated by a given phased array antenna.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1 is a simplified diagram of a commercial aircraft implementing a communications terminal and method in accordance with a preferred embodiment of the present invention, and illustrating the aircraft in the process of making a soft handoff between two BTS sites;

FIG. 2 illustrates the shape of the borders of the cells formed by adjacent BTSs placed on a regular triangular grid of equal spacing;

FIG. 3a is a view of the undercarriage of a portion of the aircraft of FIG. 1 illustrating a plan view of the directional phased array antenna system mounted to the undercarriage, with the arrayed antenna removed;

FIG. 3b is a front view of the antenna system of FIG. 3a;

FIG. 4 is a perspective view of one of the seven antennas illustrated in FIG. 3a;

FIG. 6 is a flow chart illustrating the major steps of operation of the beam former subsystem;

FIG. 8 is a graph of the phased array geometry of the seven element antenna of FIG. 3a;

FIGS. 9(a)-9(g) illustrate the gain patterns resulting from the beam synthesis method of the present invention at various azimuth angles along the horizon;

FIGS. 10(a)-10(g) are a plurality of polar plots depicting the antenna gain along the horizontal plane (azimuth cut in antenna terminology) for the gain patterns illustrated in FIGS. 9(a)-9(g), respectively;

FIGS. 14a-14k illustrate polar plots of the blended patterns in FIGS. 13a-13k, respectively, in the $\alpha=90°$ plane;

FIG. 15 is a simplified diagram illustrating a terrestrial application for an alternative preferred embodiment of the present invention.

DETAILED DESCRIPTION OF THE PREFERRED EMBODIMENTS

Figure 4:
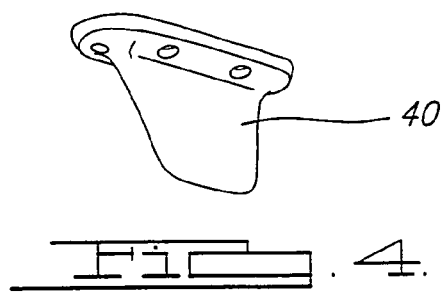

The following description of the preferred embodiment(s) is merely exemplary in nature and is in no way intended to limit the invention, its application, or uses.

Referring to FIG. 1, there is shown an aircraft radio terminal (ART) 10 in accordance with a preferred embodiment of the present invention. The ART 10 is implemented, in this example, on a commercial aircraft 12 having a fuselage 14. One or more occupants on the aircraft 12 have in his/her possession a cellular telephone 16, which alternatively could form a wireless personal digital assistant (PDA). The aircraft 12 includes an aircraft navigation subsystem 18 and an onboard network 20 that incorporates a server/outer 22 in communication with a local area network (LAN) implemented on the aircraft 12. Although not shown, it will be appreciated that the LAN implemented on the aircraft 12, in one preferred form, makes use of a plurality of wireless access points spaced throughout the interior cabin area of the aircraft 12. The wireless access points enable communication with the cellular phone 16 throughout the entire cabin area of the aircraft 12. One suitable wireless LAN system which may be implemented is disclosed in U.S. patent application Ser. No. 09/878,674, filed Jun. 11, 2002, and assigned to the Boeing Company, which is incorporated by reference into the present application.

The ART 10 of the present invention, in one preferred embodiment, comprises an antenna controller 24 that is in communication with a base transceiver station (BTS) position look-up table 26. The antenna controller 24 is also in communication with a beam forming network 28. The beam forming network 28 is in bidirectional communication with at least one RF transceiver 30, which in turn is in bidirectional communication with the server/router 22. While the ART 10 of the present invention will be described, in one embodiment, as being used to facilitate cellular communications, which typically fall within the UHF/L band frequency spectrum, it will be appreciated that the ART 10 can just as readily be utilized to communicate electromagnetic wave signals in other frequency spectrums.

The antenna controller 24 operates to calculate the phase and amplitude settings within the beam forming network 28 to steer the beam from a phased array antenna system 32 mounted on an undercarriage 34 of the fuselage 14. Phased array antenna system 32 is illustrated being covered by a suitably shaped radome. A significant feature of the present invention is that the beam forming network 28 controls the phased array antenna system 32 to create two simultaneous and independently steerable lobes from a single antenna beam of the antenna system 32. Alternatively, the beam forming network 28 can control the antenna system 32 to create a single beam having only a single lobe, which is the mode of operation that would be used for the vast majority of operating time of the aircraft 12. Generating a beam with only a single lobe aimed at one BTS station spatially isolates the transmit signal from the antenna system 32. This reduces network interference to adjacently located, but non-target, BTS sites, and thus increases the communication capacity of the overall network.

With further reference to FIG. 1, the BTS look-up position table 26 includes stored data relating to the locations (latitude and longitude) of all of the BTS sites in the cellular network. The aircraft navigation subsystem 18 provides information on the position of the aircraft 12 (latitude, longitude and altitude), as well as attitude information (i.e., pitch, roll and heading). Alternatively, the ART 10 may comprise its own geolocation and attitude sensors. In either implementation, the locations of the network BTSs, as well as the location and attitude of the aircraft 12, are provided to the antenna controller 24. From this information, the antenna controller 24 calculates the antenna pointing angles needed to accurately point the lobe (or lobes) of the beam from antenna system 32 at the target BTS (or BTSs) within the cellular network.

New Communication with One BTS Site

In its simplest phase of operation, the aircraft 12 communicates with a single BTS site. For example, assume that the aircraft 12 is communicating with BTS site 36(a) (BTS #1) in FIG. 1. The beam forming network 28 generates a beam having a single lobe that is directed towards BTS1 36(a). The closest BTS site will generally provide the maximum received signal strength in a network where all BTSs transmit at the same power, using identical antennas having a nearly omnidirectional pattern in azimuth, in a predominantly line-of-sight condition (which is typically the case for ATG networks). Thus, in one preferred form the ART 10 determines antenna pointing directions completely independently of the operation of the radio transceivers 30. This is a significant feature because it permits the use of commercial off-the-shelf (COTS) transceiver modules and transmission standards that are designed to operate with standard cellular handsets having omnidirectional antennas. The ART 10 maintains the link width BTS1 36(a) until its aircraft navigation system 18, in connection with the BTS look-up position table 26, determines that the aircraft 12 is approaching a different BTS and will need to make a handoff from the presently used BTS1 site 36(a) to a new BTS site. Ideally, the handoff should be "seamless," meaning that there is no obvious degradation in quality of service to users using their cellular devices onboard the aircraft 12 as the handoffs are performed. Soft handoffs are preferred because they are generally viewed as the most reliable, meaning that they provide the lowest probability of a dropped connection, as well as the best quality handoff (i.e., a handoff that produces no apparent degradation of service). Present day $3^{rd}$ generation cellular networks almost always use soft handoffs (but are capable of hard handoffs in unusual circumstances, such as when making channel changes).

Description of Coverage Cells

With brief reference to FIG. 2, each BTS station 36 provides service coverage to an area of the earth, and the earth-space above it, called a "cell." When BTSs are placed on a regular triangular grid of equal spacing, then the cells that have boarders at the midpoints between the BTSs appear as hexagons, as shown in FIG. 2. Each hexagon thus represents an area of coverage (i.e., cell) provided by a particular BTS site. A regular triangular grid of BTSs has been illustrated merely as one example of how the BTS sites could be arranged. Practical considerations in the siting of BTSs (e.g., terrain, utilities, access, etc.) and uneven distribution of cellular traffic density usually cause cellular networks to have irregular BTS spacing and non-hexagonal shaped cells. For an ATG cellular network, the maximum cell size is typically set to ensure line-of-sight visibility at some minimum altitude. For example, if a requirement is to serve aircraft flying above 10,000 ft. (3033 m) altitude, then the maximum cell radius should not exceed about 150 miles (241.5 km), which is the radial horizon distance at 10,000 feet to a 50 ft. (15.16 m) tall tower at UHF.

Soft Handoff

The ART 10 performs a soft handoff as the aircraft 12 is leaving a coverage area of one BTS and entering the coverage area of a different BTS. In FIG. 2, aircraft 12 is illustrated as performing a soft handoff from BTS #1 to BTS #2. During the short period of time, typically less than one minute, when the soft handoff is occurring, the aircraft 12 is communicating with both base stations (BTS #1 and BTS #2) simultaneously. When an aircraft, for example aircraft 12a in FIG. 2, is not crossing the boundary between two cells, the aircraft only communicates with a single BTS. An aircraft flying through the center of cells at approximately 600 mph (996 km per hour) would only be in a soft handoff procedure for less than about 3.3% of its operating time, assuming soft handoffs that last about one minute in duration and cells of 150 mile (241.5 km) radius.

With reference to FIGS. 1 and 2, the ART 10 provides the advantage of requiring no coordination or communication between the antenna controller 24 and the radio transceiver 30 to recognize the need for a handoff, or to coordinate a handoff. Thus, the present invention, the antenna controller 24 does not know the exact moment that the ART 10 begins and ends a soft handoff. However, when the antenna controller 24, operating in connection with the BTS look-up position table 26, determines that a soft handoff procedure needs to be implemented, the antenna controller 24 initially causes a dual lobed beam to be generated from the antenna system 32. The dual lobed beam has one of its lobes 32a (FIG. 1) directed at the BTS that is presently being used, and the other lobe 33b, pointed at a nearly equidistant BTS, which is to receive the soft handoff. The radio transceiver 30 reacts by adding the second BTS 36(b) to its "active" list. Then the antenna controller 24 "fades out" the lobe 33a pointing to the initial BTS1 36a, leaving only one lobe (lobe 33b) pointing at the new BTS2 (BTS 36b). The radio transceiver 30 reacts to the artificial fade by handing off to the new BTS 36b having a stronger (i.e., better) quality signal. The rate at which the fade occurs may be controlled by the antenna controller 24, however, as explained earlier, the fade preferably occurs over a period of about one minute or less. An instantaneous fade, or transition from a dual lobed beam to a single lobe beam, may reduce the reliability of the handoff, but still could be performed if a particular situation demanded an immediate handoff. In terrestrial cellular networks, fading due to multipath or shadowing can occur very quickly (less than one second), but it is not instantaneous. So the ability to "soft fade" allows the ART 10 to better mimic what occurs on the ground with conventional omnidirectional antennas. Since the antenna controller 24 performs the creation (i.e., fading in) of a dual lobed beam, as well as the fading out to a single lobe beam, the hand off from one BTS to another BTS appears as a seamless transition to the cellular user on the aircraft 12. An additional advantage is that no input or control is required from crew members onboard the aircraft 12 to monitor and/or manage the soft handoffs that need to be implemented periodically along the route that the aircraft 12 travels.

Criteria for Hand-Off Decision Making

There are at least several different decision making criteria that may be employed in determining exactly when a hand off from one BTS station to another BTS station may be initiated. One is by using a suitable "nearest BTS" algorithm. Such an algorithm simply chooses to use the BTS which is closest to the aircraft at any given time. For this a database on board the aircraft is needed that contains the location data (latitude, longitude and possibly altitude) for all the BTSs. In this example the BTSs are all ground-based, so altitude data would not be consideration. At regular intervals, which could typically be every 30 seconds or so, the aircraft makes a simple calculation, based on the data in the database and the location of the aircraft (taken from the aircraft's navigational system), to determine which of the BTSs in its vicinity are closest to the aircraft. This data is used to estimate when a new BTS (i.e., one other than the "active" BTS) will come within a distance of the aircraft (considering the heading of the aircraft) that is approximately the same distance from the aircraft as the active BTS (and thereafter will become closer as the aircraft continues on its path of travel). A handoff from the first BTS to the second will be made at this time, so that the aircraft is always operating with the closest BTS.

A suitable "closest BTS" algorithm will now be described below. The locations of all the BTSs (latitude, longitude and height asl) are available from the BTS database, which will be loaded on the aircraft. The location of the aircraft (latitude, longitude and height above seal level ("asl")) as a function of time is available from the aircraft's navigational system. From this locational data, the line-of-sight distance of the aircraft from each of the base stations is calculated as:

$$s = \text{Sqrt}((xa-xbts)^2 + (ya-ybts)^2 + (za-zbts)^2)$$

where (xa,ya,za) and (xbts,ybts,zbts) are the Cartesian coordinates (in an earth-fixed coordinate system) of the aircraft and base station respectively. These are computed from the latitude, longitude and altitude data:

$$x = (re+h)*\text{Cos}(lat)*\text{Cos}(long)$$

$$y = (re+h)*\text{Cos}(lat)*\text{Sin}(long)$$

$$z = (re+h)*\text{Sin}(lat)$$

where "re" is the earth's radius, "h" is the height asl, and "lat" and "long" are latitude and longitude respectively.

The aircraft/BTS distance does not necessarily need to be calculated for all the BTSs in the database, but only for those that are visible and above the radio horizon. Thus, performing a geometric pre-filtering calculation to first identify only those BTSs that are above the radio horizon would be made first. Alternatively, an even simpler approach would be to just eliminate all BTSs that are more than, for example, five-hundred miles from the aircraft.

A second method for determining when to initiate a hand off involves using a "best Signal/Interference (S/I) ratio" algorithm as part of periodic, real time calculation. For example, if the BTSs were uniformly distributed, the "nearest BTS" algorithm would work near-optimally. In practice there is typically clustering of BTSs in metropolitan areas, and in particular close to airports. If there are 2 BTSs close to each other, then during a receive operation, if the antenna system 32 steers its primary lobe to work with one of these BTSs, there may be strong interference coupled into the antenna system 32 from the other BTS, as both BTSs, may be within the relatively wide single lobe beam. In such situations, a higher S/I ratio and hence better system performance would be obtained by selecting and using another BTS which is actually not the next closest BTS to the aircraft. Preliminary testing has indicated that for realistic BTS locations (including some BTS clustering), using the "best S/I" approach increased the worst case S/I by around 5 dB.

The real time version of this algorithm performs the same calculations as was performed during the above-mentioned testing in simulations, but in real time. The same BTS location database would be needed to support this, as would aircraft positional data from the aircraft's navigational system. At each time point along the flight path, for example, on the order of every 30 seconds, the system would first identify which base BTSs are above the radio horizon and hence "visible" to the aircraft. The system would then calculate the S/I ratio with the main lobe pointed at each of these in turn, with the "S" being the power received via the main lobe from the selected BTS, and the "I" being the aggregate interference power received via the sidelobes or side of the main lobe from all the other BTSs. Having carried out this calculation for each of the visible BTSs, the one with the highest S/I would be selected as the best to operate with. The time for handoff would be estimated as that time at which the S/I ratios for the best and second best BTSs become equal, with the second best about to out perform the previous best and deliver a higher S/I.

A third method for deciding exactly when to make a hand off involves a using the "best S/I Ratio" method described above, but in pre-calculated look-up tables, rather than as part of real time calculations. The result here is the same as the second method described above, i.e., that the metric used to select the best BTS is the S/I ratio. The difference is that rather than compute S/I estimates in real time, the calculations would be made off-line with the results stored in look-up tables. These tables would define "patches" on the ground whose boundaries are defined in latitude and longitude, with each patch defining the geographical area within which a particular BTS provides the best S/I. When the aircraft is about to cross from one patch to the next, it would prepare to initiate a handoff, with the handoff ideally occurring on the patch boundary. In practice, the above is a simplification because it is a 3-D rather than 2-D problem, with aircraft altitude representing the 3rd dimension, and the patches turning into volume elements. Significant computer resources would typically be needed to compute these look-up tables, but the creation of such look-up tables still are a possibility.

Phased Array Antenna Subsystem

Referring now to FIGS. 3a, 3b and 4, the antenna system 32 can be seen in greater detail. The antenna system 32 incorporates, in one preferred implementation, seven independent monopole blade antenna elements 40 (FIG. 3a) mounted directly to the fuselage 14 of the aircraft 12 on its undercarriage 34. The antenna elements 40, in this example, are arranged in a hexagonal pattern. The antenna system 32, however, can be implemented with any size of phased array antenna having any number of antenna elements arrayed in virtually any geometric form. However, given practical size constraints, and considering operation at UHF frequencies around 850 MHz, a phased array antenna having seven elements is an acceptable choice. With a seven element phased array antenna, one near-optimal array geometry is that of six elements at the vertices of a hexagon and the seventh at the center, as illustrated in FIG. 3a. The antenna elements 40 can be of a variety of types, but in one preferred implementation each comprises a quarter wavelength monopole element having an omnidirectional gain pattern in the azimuth plane. The seven monopole antenna elements 40 are mounted in a direction generally perpendicular to the undercarriage 34 of the aircraft. This provides vertical polarization when the aircraft 12 is in a level attitude, as shown in FIG. 1. The antenna elements 40 are available as commercial off-the-shelf products from various aeronautical antenna suppliers. For example, one suitable antenna is available from Comant Industries of Fullerton, Calif. under Part No. CI 105-30. The antenna elements 40 are spaced approximately a half wavelength apart in a triangular grid to create the phased array antenna shown in FIG. 3a. Alternatively, antenna elements providing horizontal polarization (such as loop antenna elements), could also be employed although the vertically polarized monopole elements provide the more straight forward implementation.

Beam Forming Subsystem

The beam forming network 28 of the present invention applies the phase and amplitude shift to the transmit and receive signals to form a beam having one or two lobes (lobes 33a and 33b), as illustrated in FIG. 1. The beam forming network (BFN) 28 also controls the beam of the antenna system 32 to provide transitional states to accomplish gradual fading between single and dual lobe states.

Figure 5:
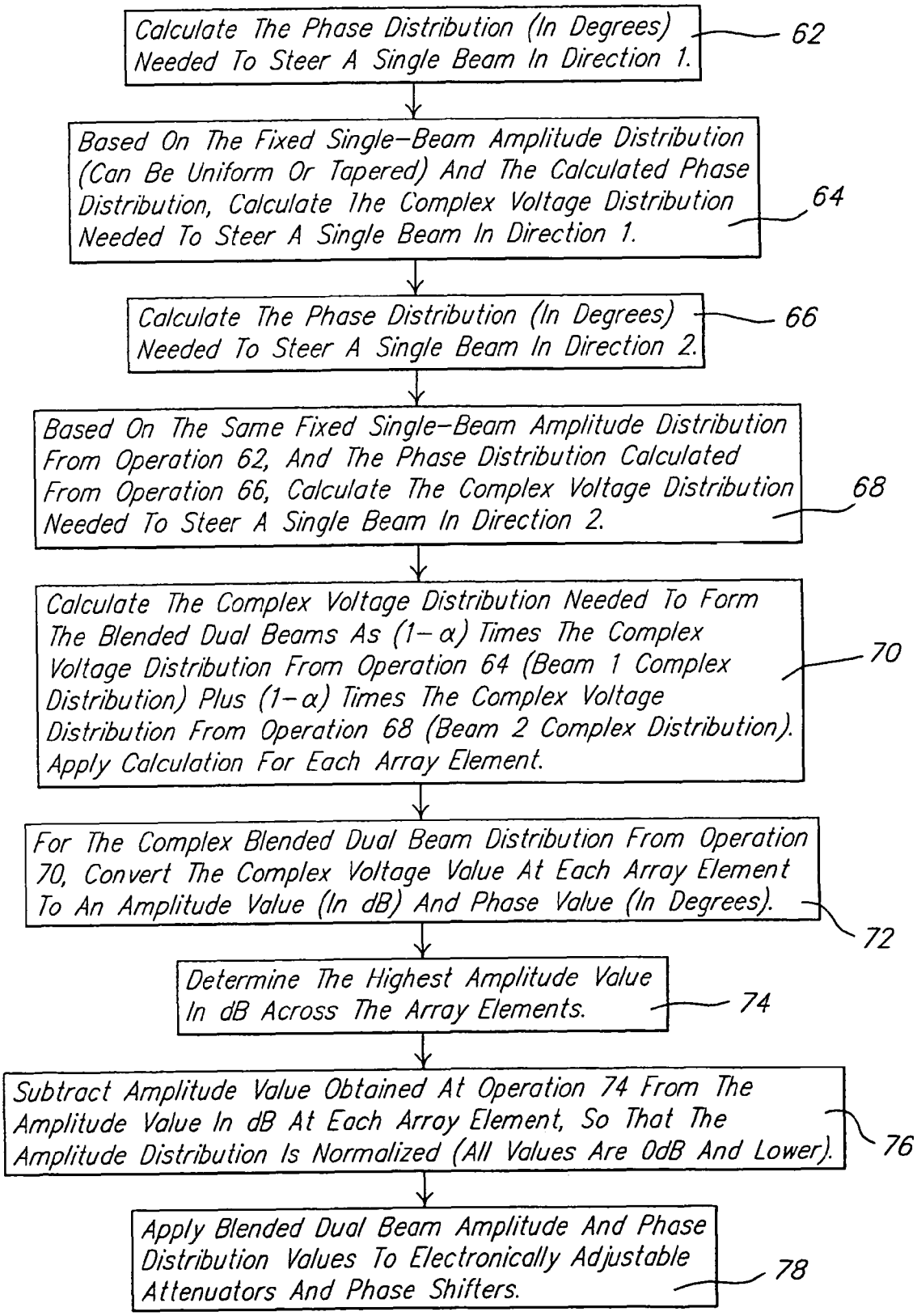
FIG. 5 is a simplified schematic representation of the beam former subsystem.
Figure 9A:
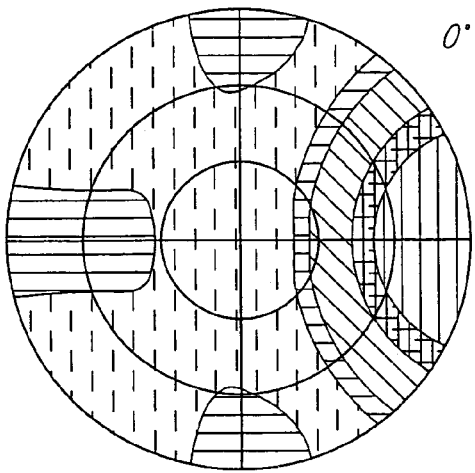
Figure 9B:
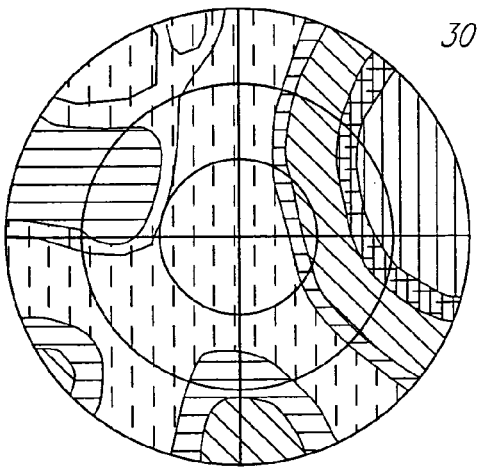
Figure 9C:
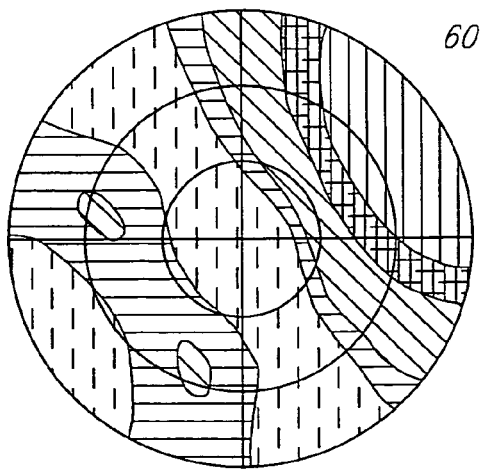
Figure 9D:
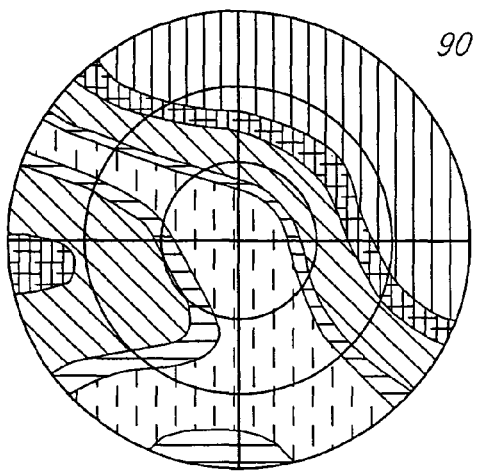
Figure 9E:
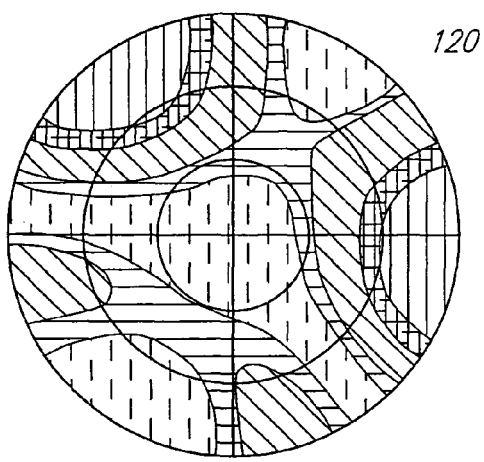
Figure 9F:
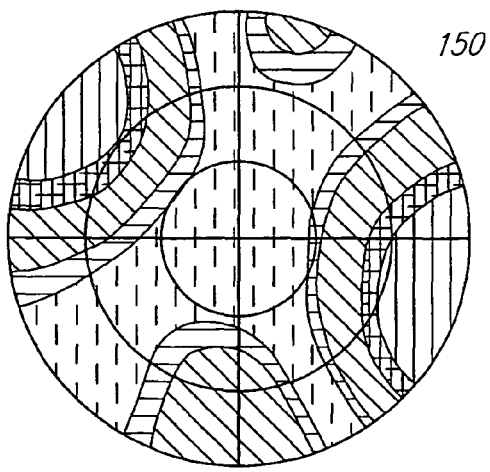

Referring to FIG. 5, a preferred implementation for the beam former network 28 is shown in greater detail. The beam former network 28 comprises a full duplex transmit/receive subsystem having an independent receive beamformer subsystem 44 and transmit beam former subsystem 46. However, the beam former network 28 may comprise a transmit only system, or receive only system, if the application only requires one-way communications. The receive beamformer subsystem 44 includes a plurality of diplexers 48, one for each antenna element 40. The diplexers 48 act as bi-directional interfacing elements to allow each antenna element to be interfaced to the components of both the receive beamformer subsystem 44 and the transmit subsystem beamformer 46.

The receive beamformer subsystem 44 includes a plurality of distinct channels, one for each antenna element 40, that each include a low noise amplifier (LNA) 50, a variable phase shifter 52 and a variable signal attenuator 54. The LNAs define the system noise temperature at each antenna element 40. The signal attenuators 54 apply their outputs to a power combiner circuit 56a, which combines the outputs of the 7 signal attenuators into a single signal. The power combiner 56a generates an output signal to an input of a diplexer 56b. The diplexer 56b functions to direct the signal received on its "RX" port from the power combiner 56a to the transceiver(s) 30. This forms a direct communication path between the signal attenuators 54 and the transceiver(s) 30. In this manner, the phased array antenna 32 can be interfaced with the transceiver(s) 30 while they are receiving electromagnetic signals.

As will be explained in greater detail in the following paragraphs, the phase shifters 52 and attenuators 54 are controlled by the antenna controller 24 and provide the ability to controllably adjust the antenna array 32 receive distribution in both phase and amplitude, to thereby form any desired receive beam pattern for the antenna array 32, including the dual beam patterns described herein. An additional capability of the beam former subsystem 28 is the ability to form nulls in the antenna pattern in selected directions to minimize the level of interference from other external sources picked up by the antenna array 32. Optionally, the variable signal attenuators 54 could be replaced with variable gain amplifiers for amplitude control without affecting functionality.

The transmit beamformer subsystem 46 includes a plurality of independent transmit channels that each include a phase shifter 58. Each phase shifter 58 is interfaced to a power divider 56c. In a transmit mode, the diplexer 56b receives the transmit signal from the transceiver 30 at is "Comm" port and directs the transmit signal to its "Tx" port. The transmit signal is then output to the input of the power divider 56c. The power divider 56c divides the transmit signal into seven signal components. The seven signal components are then each independently input to an associated one of the diplexers 48, and then output from the diplexers 48 to each of the antenna elements 40. In this manner the transceiver 30 is interfaced to the antenna array 32 during a transmit operation.

The particular beam forming implementation described in connection with beamformer subsystem 28 carries out the beam forming function at RF frequencies using analog techniques. Alternatively, identical functionality in beam pattern control could be provided by performing the beam forming at IF (Intermediate Frequency) or digitally. However, these methods would not be compatible with a transceiver having an RF interface, and would thus require different, suitable hardware components to implement.

General Operation of Beam Former Subsystem

With reference to FIG. 6, a flowchart illustrating major operations performed by the beam former subsystem 28 is shown. A principal objective is to calculate the complex array distribution (amplitude in dB and phase in degrees at each antenna element 40) needed to produce two beams in directions 1 and 2 with a blending factor ($\alpha$). The blending factor ($\alpha$)=0 corresponds to a beam only in direction 1; $\alpha$=1 corresponds to a beam only in direction 2; and α=0.5 corresponds to two separate beams with one pointing in direction 1 and the other pointing in direction 2, with the beams having equal gain. At operation 62, the phase distribution (in degrees) needed to steer a single beam in direction 1 is determined. At operation 64, based on the fixed (i.e., scan invariant) single beam amplitude distribution (which can be uniform or tapered) and the calculated phase distribution at operation 62, the complex voltage distribution needed to steer a single beam in direction 1 is calculated. At operation 66, the phase distribution (in degrees) needed to steer a single beam in direction 2 is calculated. At operation 68, using the same fixed single beam amplitude distribution from operation 64 and the phase distribution calculated from operation 66, the complex voltage distribution needed to steer a single beam in direction 2 is calculated.

At operation 70, the complex voltage distribution needed to form the blended dual beams as $(1-\alpha)$ times the complex voltage distribution from operation 64 (beam 1 complex distribution) plus $(1-\alpha)$ times the complex voltage distribution from operation 68 (beam 2 complex distribution), is calculated. This calculation is applied for each antenna element 40.

At operation 72, for the complex blended dual beam distribution from operation 70, convert the complex voltage value at each array element to an amplitude value (in dB) and a phase value (in degrees). At operation 74, the highest amplitude value in dB across the antenna elements 40 is determined. At operation 76, this highest amplitude value is then subtracted from the amplitude value in dB at each antenna element 40 so that the amplitude distribution is normalized (i.e., all values are zero dB or lower). At operation 78, the calculated, blended dual beam amplitude (in dBs) and phase distribution (in degrees) are then applied to the electronically adjustable signal attenuators 54 and phase shifters 52,58 in the beam forming network 28.

Specific Description of Amplitude Control and Phase Shifting Performed by Beamformer Subsystem The following is a more detailed explanation of the mathematical operations performed by the antenna controller 24 in controlling the beam former subsystem 28 to effect control over the amplitude and phase shift of the signals associated with each of the antenna elements 40. Using complex math, the signal processing that occurs in the antenna controller 24 for the received signals from each of the seven antenna elements 40 (I=1-7) is to first multiply each signal by $A_i e^{j\psi_i}$ where $A_i$ is the desired amplitude shift and $\Psi i$ is the desired phase shift, before combining the signals to form the antenna beam. The beam former output signal, $S_{rx}(t)$, to the receiver in the transceiver subsystem 30 of FIG. 1 is equal to:

$$S_{rx}(t) = \sum_{1}^{n} S_i(t) A_i e^{j\psi_i} \quad (1)$$

Where $S_i(t)$ is the input signal from the $i^{th}$ antenna element 40. The same signal processing is applied in reverse to form the transmit beam. The transmit signal is divided "n" ways (where "n" is the number of antenna elements in the antenna system 32) and then individually amplitude and phase shifted to generate the transmit signal, $S_i(t)$, for each antenna element 40. The term "$S_{tx}(t)$" is the transmit output from the transceiver 30 in FIG. 1.

$$S_i(t) = 1/n S_{tx}(t) A_i e^{j\psi_i} \quad (2)$$

One embodiment of the invention performs the beam former signal processing of equations (1) and (2) in the digital domain using either a general purpose processor or programmable logic device (PLD) loaded with specialized software/firmware, or as an application specific integrated circuit (ASIC). A second embodiment may employ analog signal processing methods that employ individual variable phase shifters, variable attenuators and divider/combiners.

A significant advantage of the ART 10 of the present invention is that only a single beam former and a single port is needed to generate a beam having a dual lobed configuration. This is accomplished by the phase and amplitude control over each antenna element 40 to synthesize an antenna beam having the desired characteristics needed to achieve the soft handoff between two BTS sites. Specifically, the beam forming network 28 (FIGS. 1 and 5) calculates a phase-amplitude distribution which is the complex sum of the two individual single-beam distributions to form a pattern with high gain in two specified directions (i.e., a dual-lobed beam).

The following describes a preferred beam synthesis method used by the ART 10. The following beam synthesis processing occurs in the antenna controller 24 of FIG. 1.

For a single steered beam in the direction $(\theta,\phi)$ in spherical coordinates with the antenna array 32 in the XY-plane, a preferred embodiment of the invention assumes an amplitude distribution $A_i$ that is uniform:

$$A_i = 1; i=1,n \quad (3)$$

and the phase distribution $\psi_i$ is given by:

$$\psi_i = -k \sin\theta(x_i \cos\phi + y_i \sin\phi); i = 1, n \quad (4)$$

$$\left( k = \frac{2\pi}{\lambda} \right)$$

where λ is the free space wavelength of the operating frequency of the antenna, and k is the free space wave number. The complex voltage distribution $V_i$ is therefore:

$$V_i = e^{-jk \sin\theta(x_i \cos\phi + y_i \sin\phi)}; i=1,n \quad (5)$$

For a dual beam distribution forming beams in the directions $(\theta_1,\phi_1)$ and $(\theta_2,\phi_2)$ the constituent complex single beam distributions are $V_{i1}$ and $V_{i2}$ respectively given by applying the two beam steering directions to equation (5) giving:

$$V_{i1} = e^{-jk \sin\theta_1(x_i \cos\phi_1 + y_i \sin\phi_1)}; i=1,n$$

$$V_{i2} = e^{-jk \sin\theta_2(x_i \cos\phi_2 + y_i \sin\phi_2)}; i=1,n \quad (6)$$

The resultant dual beam distribution is the complex mean of the constituent single beam distributions:

$$V_{iDB} = (V_{i1} + V_{i2})/2; i=1,n \quad (7)$$

Note that for a receive-only system, the power normalization is arbitrary if the system noise temperature is established prior to the beam former or if the system is external interference rather than thermal noise limited. For a transmit system the formation of simultaneous dual beams must incur some loss unless the constituent beams are orthogonal, and the dual beam distribution amplitudes will be modified by some scaling factor relative to equation (9). One way of calculating the amplitude normalization is to calculate the amplitude coefficients across the array antenna elements 40 and divide these by the largest value, so that one attenuator is set to 0 dB and the others are set to finite attenuation values. Alternatively it can be shown that it is possible to form simultaneous dual beams with phase-only distribution control, albeit with poorer efficiency for some beam separation angles (see FIG. 11). In this case the amplitude distribution remains uniform with the phase distribution given by the phase terms of the distribution defined by equation (9).

Figure 7:
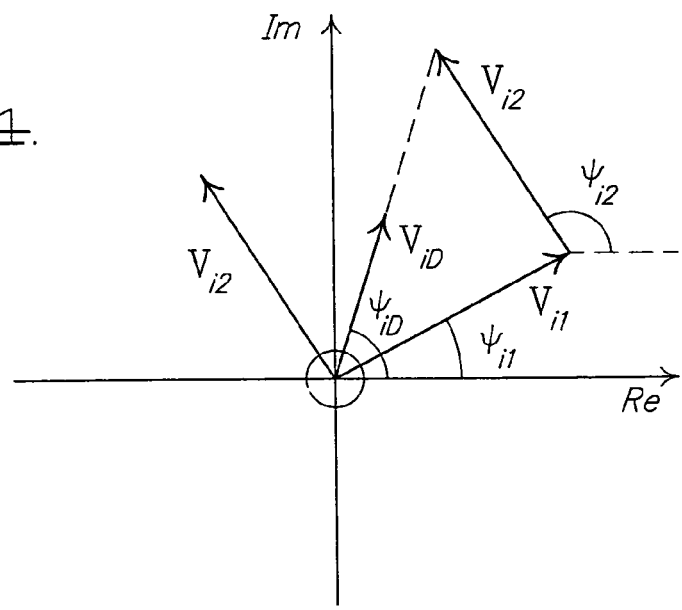
FIG. 7 is a graphical representation of dual beam distribution produced from a single antenna element.

The complex distribution voltage at a single element from equation (5) is shown graphically in FIG. 7. The resultant complex dual beam distribution is expressed as:

$$V_{iDB}=A_{iDB}e^{j\psi_{iDB}}; \ i=1,n \quad (8)$$

where $A_{iDB}$ and $\psi_{iDB}$ are the amplitude and phase respectively. These are given by:

$$A_{iDB} = \sqrt{2+2\cos(\psi_{i1}-\psi_{i2})}; \quad i=1,n \quad (9)$$

$$\psi_{iDB} = \arctan\left(\frac{\sin\psi_{i1}+\sin\psi_{i2}}{\cos\psi_{i1}+\cos\psi_{i2}}\right); \quad i=1,n \quad (10)$$

Additional Analysis of Antenna Performance and Theory

Further to the above description of how the dual lobes of the beam of the antenna system 32 are formed, the following analysis is presented to further aid in the understanding of the performance of the seven-element antenna array shown in FIGS. 3a, 3b and 4. Again, it will be appreciated that phased array antennas having other numbers of elements and of various sizes could be implemented with the present system.

Figure 8:
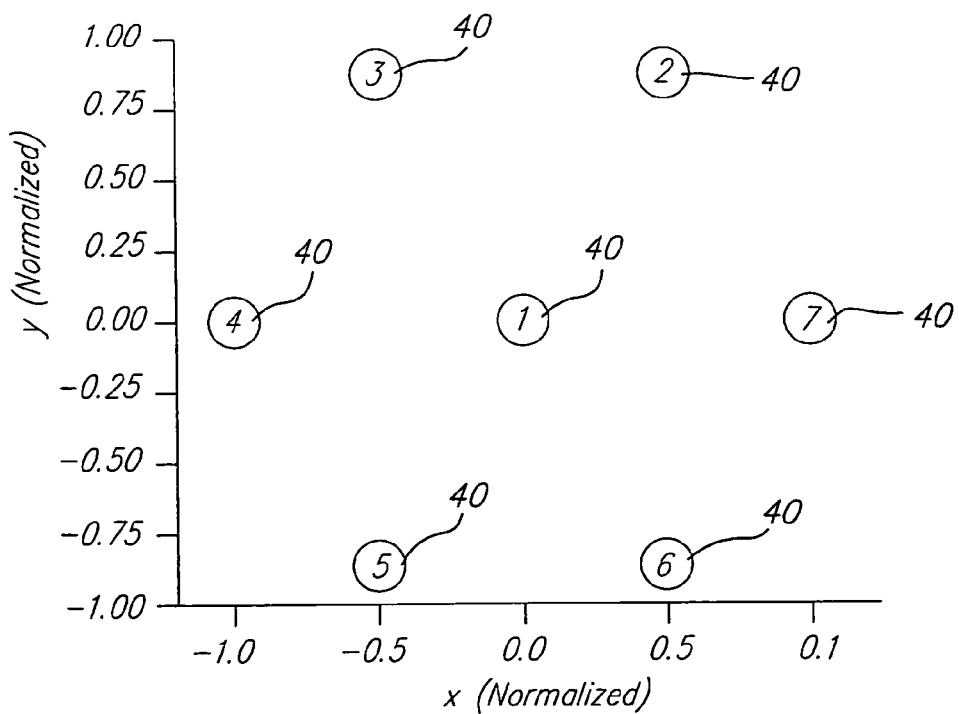

The exact phased array geometry of the antenna system 32 is shown in graphical form in FIG. 8. Six elements are hexagonally spaced with a seventh element at the center. The element spacing is 0.42λ, which was previously selected for maximum gain. The amplitude distribution for the single beam patterns is uniform. All the results presented below are for cases where the lobes are directed to the horizon in the plane of the array. The lobes can be pointed at any elevation angle but for simplicity, this discussion involves only cases where beams are scanned towards the horizon because this is the most common operational condition, particularly during hand-off from one BTS to the next. The term "φ" is the azimuth angle along the horizon and φ=0° is the direction towards the right side of the page. This analysis demonstrates the synthesis of dual lobe patterns where one lobe is always pointing at φ=0° and the other lobe is offset from it by Δφ, although the first lobe can be synthesized as readily at any specified azimuth pointing angle.

Vertically polarized λ/4 monopole antenna elements are assumed. The gain patterns resulting from a preferred beam synthesis method are shown in FIG. 9 for the cases of Δφ=0°, 30°, 60°, 90°, 120°, 150° and 180°. These are plots of antenna gain where the center of the circle is the direction normal to the plane of the antenna system 32 (straight down towards the earth when the antenna system 32 is mounted horizontally on the undercarriage 34 of the aircraft 12 in level flight). The outside of the circle is a direction along the plane of the antenna system 32 (towards the horizon when the antenna system 32 is mounted on an aircraft in level flight). The colors depict the magnitude of antenna gain (directivity) with red/orange representing highest gain and blue being lowest gain (the order of magnitude, from highest to lowest, being red/orange, yellow, green, light blue, dark blue). FIG. 8 clearly demonstrates that a preferred beam synthesis method of the present invention accomplishes the intended function of producing two lobes that are independently steerable in two different directions.

The antenna gain along the horizontal plane (azimuth cut in antenna terminology) is depicted in the polar plots of FIG. 10. The gain normalized to the peak gain with a single lobed pattern is measured from the center of the circle with 0 dB at the outside of the circle and −20 dB at the center. The azimuth angles around the circle are labeled on the plots.

Of particular interest in evaluating the performance of the antenna system 32 is the variation in peak gain that occurs as a single lobe is separated into two lobes. It would be reasonable to assume that the peak gain of dual lobes should be 3 dB less than that of a single lobe, since the available antenna gain is split equally between the two lobes. For a single beam in the θ=90° plane, the beam peak gain varies between 12.7 dBi and 13.1 dBi, depending on the azimuth beam pointing angle. For two separate lobes therefore there is an expectation that the gain for each beam will typically be around 10 dBi (3 dB below the single-beam gain).

Figure 11:
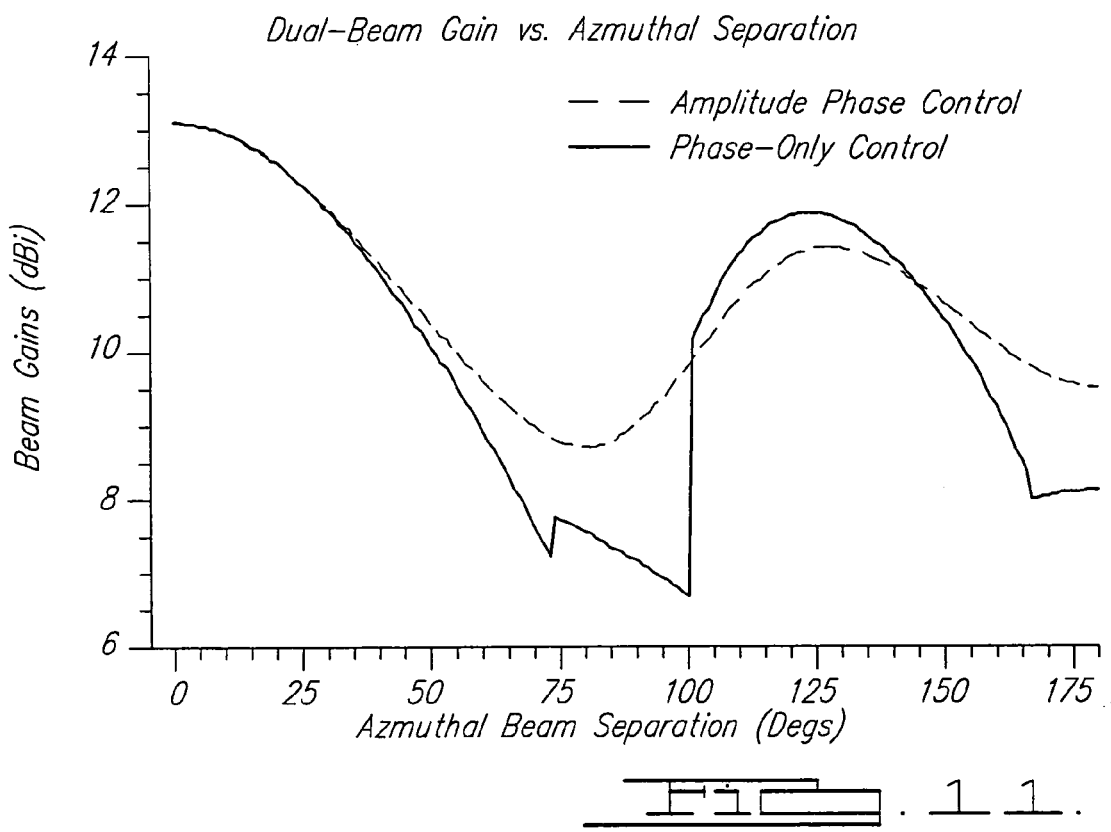
FIG. 11 is a graph of the dual beam gain versus azimuthal separation for amplitude phase control and phase-only control, of the phased array antenna system implemented in the present invention.

FIG. 11 plots the dual-lobe gain vs. azimuthal beam separation. For both the "Amplitude and Phase Control" and "Phase-Only Control" cases there is only a single curve visible, as the gains of the two lobes are identical.

For 0° separation, the two lobes merge into a single lobe with a gain of 13.1 dBi. For finite separations the gain is reduced, however with the exception of a dip in the gain curve at around 80° to a little below 9 dBi, gain values on each lobe of around the expected 10 dBi or greater are realized. Note (see the following contour and polar pattern plots of FIGS. 13 and 14 for details) that for lobe separations below around 80° there is essentially just a single broadened lobe, which eventually bifurcates into two separate lobes.

Single→Dual→Single Lobe Soft Transition (Blending)

A significant feature of the present invention is the soft handover from one lobe (pointing direction) to another that is implemented by a gradual transfer of pattern gain from one pointing direction to a new pointing direction, as opposed to abrupt transitions from a single lobe in direction 1 to a dual lobe covering both directions, and then from the dual lobe to a single beam in direction 2.

Figure 12:
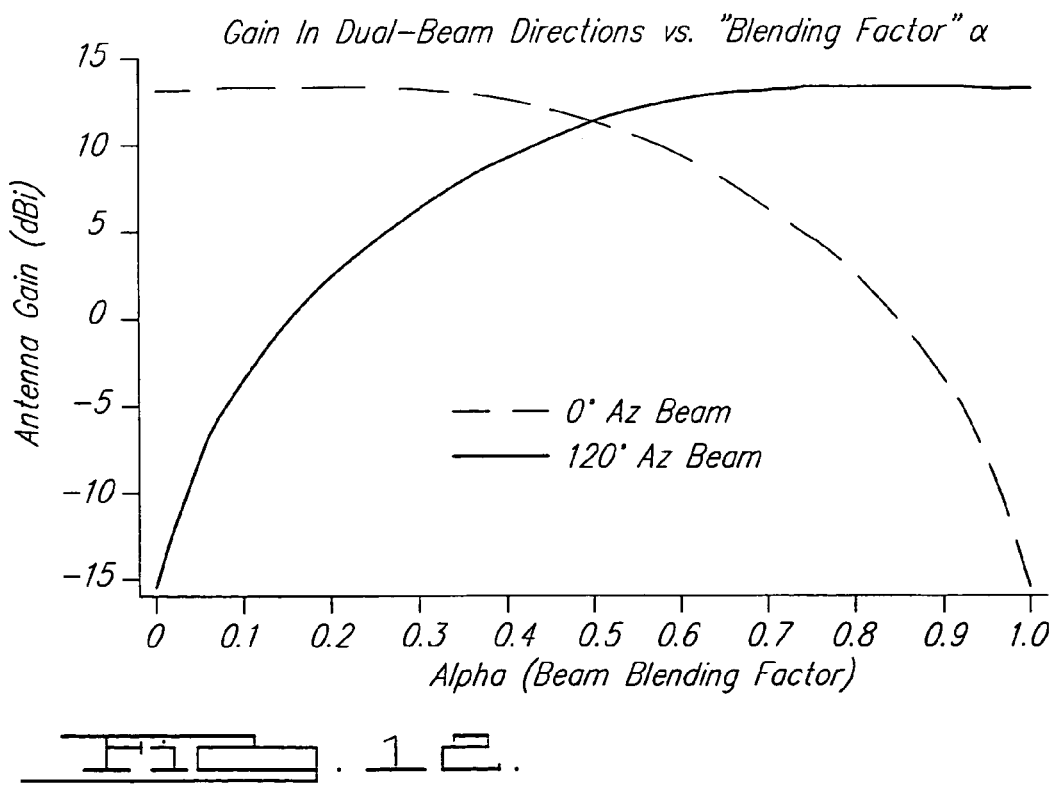
FIG. 12 is a graph of the gain in the dual-beam directions of the antenna of the present system versus the "blending factor" $\alpha$.
Figure 13A:
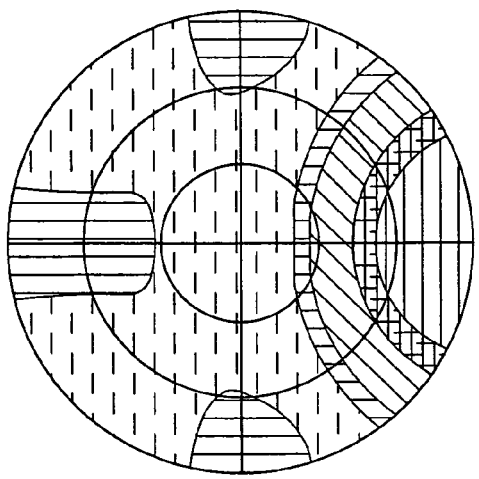
FIGS. 13a-13k present predicted blended patterns versus $\alpha$ as false color contour plots of the two lobes of the beam, starting with only a single lobe, transitioning to a dual lobe pattern, and then back to a single lobe, in the $\alpha=90°$ plane.
Figure 13B:
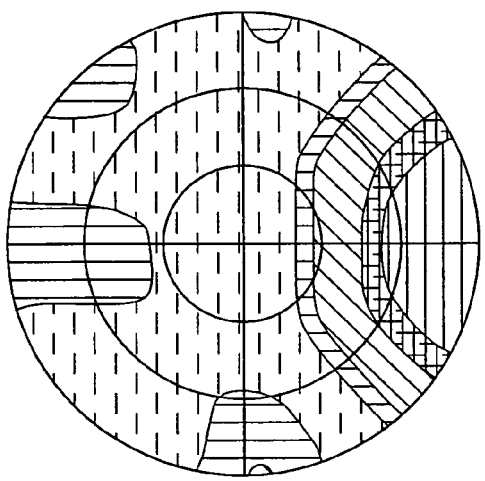
Figure 13C:
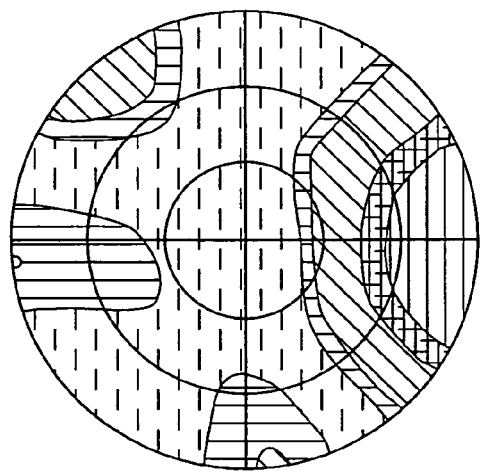
Figure 13D:
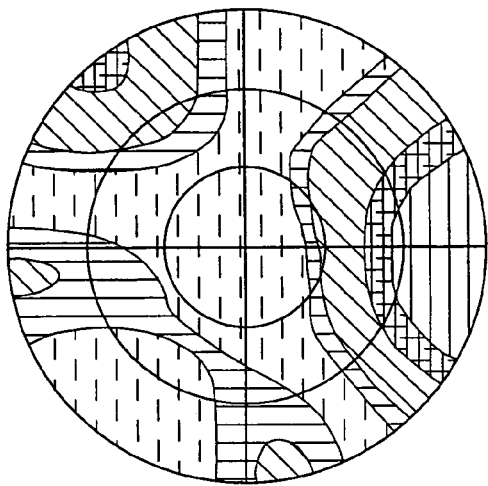
Figure 13E:
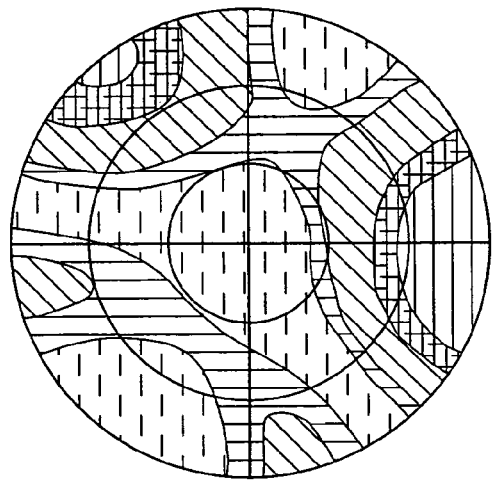
Figure 13F:
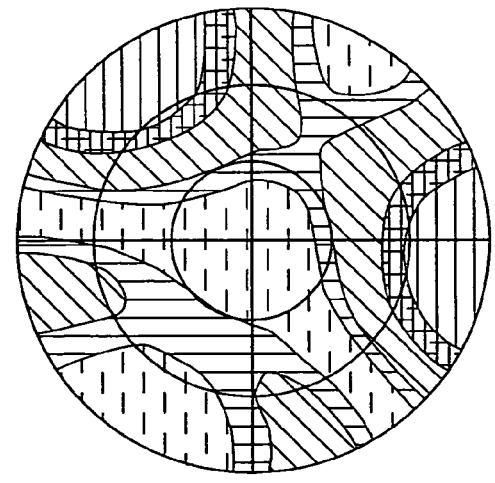
Figure 13G:
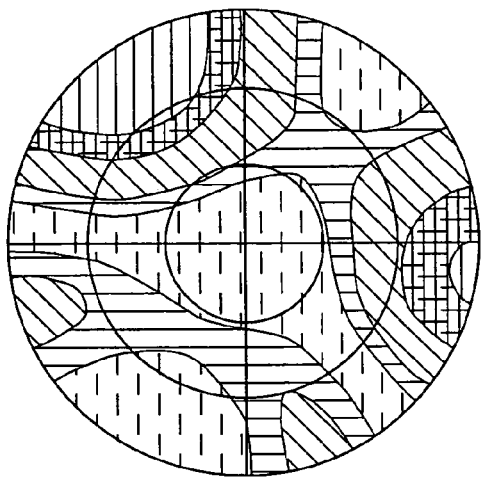
Figure 13H:
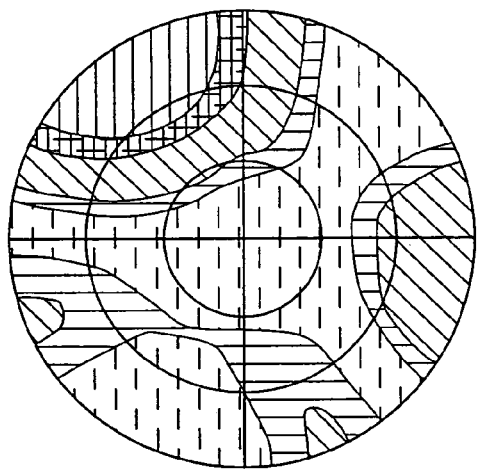
Figure 13I:
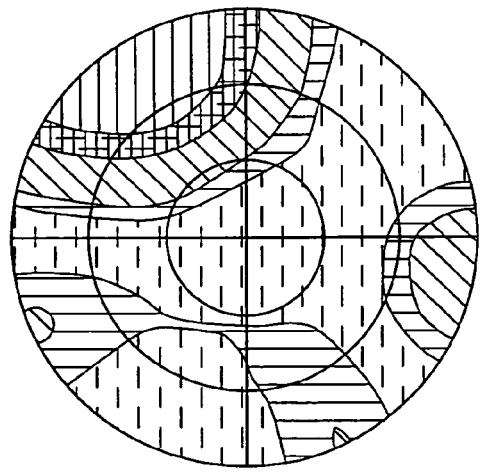
Figure 13J:
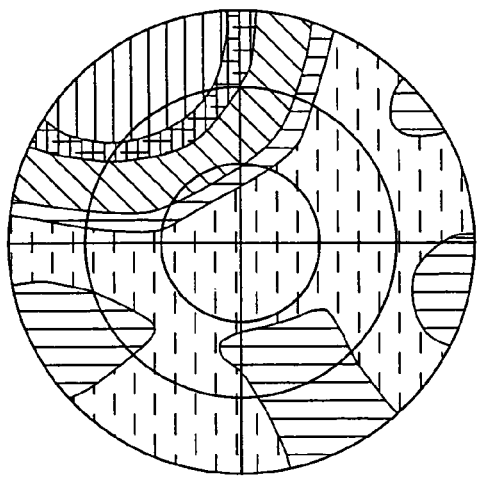
Figure 13K:
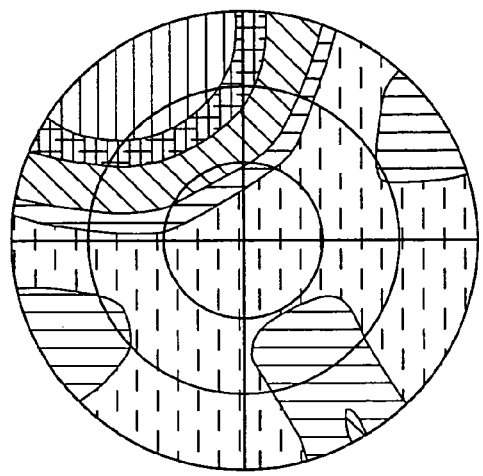

The beam forming network 28 (FIG. 1) implements such a gradual pattern transition by linearly "blending" the complex array distributions for the individual single lobed beams. The resultant distribution and pattern is characterized by the "blending factor" α, with α=0 corresponding to a single beam in the first direction, α=1 corresponding to a single beam in the second direction, and α=0.5 corresponding to a dual-lobe pattern providing high gain in both directions. FIG. 12 plots the antenna pattern gain in the two pointing directions (both in the θ=90° or horizon plane), with the lobe pointing directions separated by 120° in azimuth.

For a "blended" lobe beam distribution with a blending factor of α (α=0 corresponds to a pure single lobe in the first direction, and α=1 corresponds to a pure single lobe in the second direction), the distribution is calculated by a modification to equation (7):

$$V_{iDB}=(1-\alpha)V_{i1}+\alpha V_{i2}; \ i=1,n \quad (11)$$

Figure 14A:
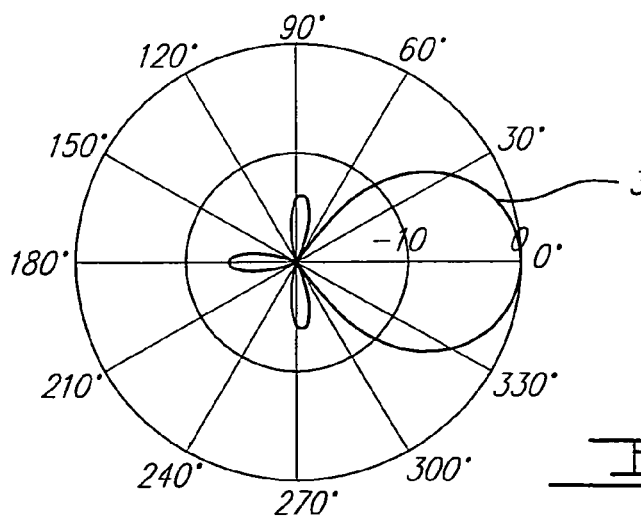
Figure 14J:
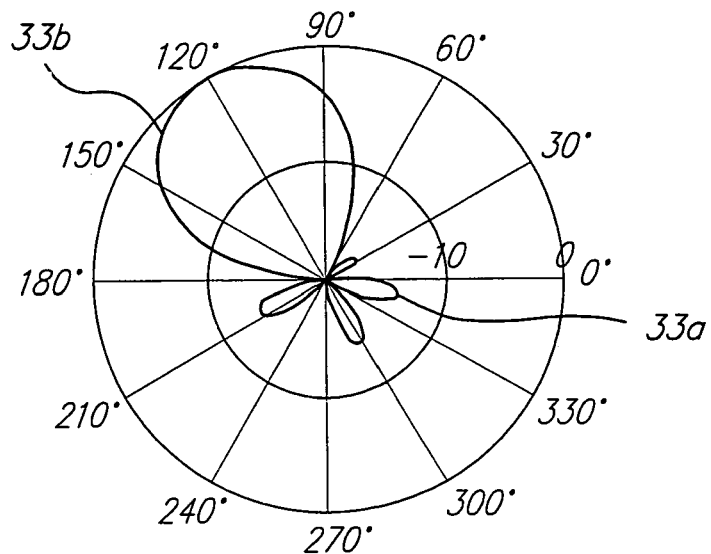
Figure 14K:
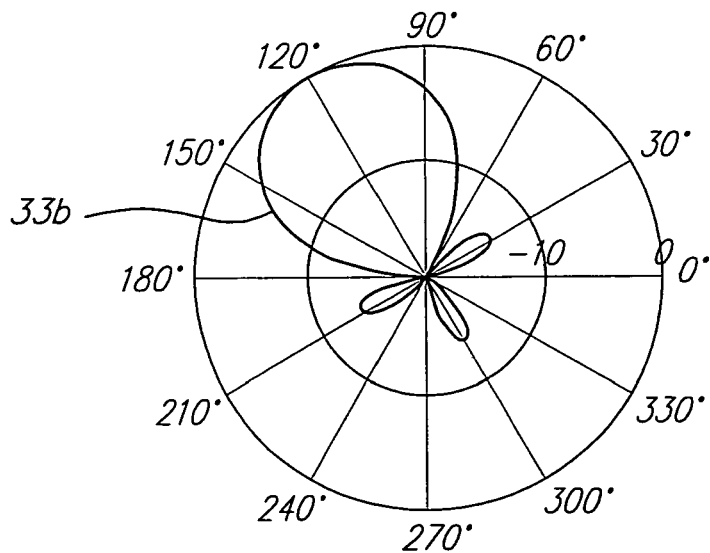

FIGS. 13 and 14 present predicted blended patterns vs. α as false color contour plots and polar plots in the θ=90° plane respectively. In all cases the azimuthal separation between the two pointing directions is 120°, with one lobe at 0° and the other at 120°. FIGS. 13 and 14 clearly demonstrate that the beam forming network 28 can accomplish a gradual transition from a single lobe beam pointing in one direction, to a dual lobed beam pointing in two directions, and back to a single lobe beam pointing in the second direction using the blending factor α.

Terrestrial Applications of Preferred Embodiments

Although a preferred embodiment of the ART 10 has been described in connection with a commercial aircraft, the system and method of the present invention is applicable with any cellular network in which communication between the BTSs and the mobile platforms is predominantly line-of-sight. Such applications could comprise, for example, aeronautical cellular networks, without the multipath fading and shadowing losses that are common in most terrestrial cellular networks. Accordingly, the preferred embodiments can readily be implemented in ATG communication networks where the mobile platform is virtually any form of airborne vehicle (rotorcraft, unmanned air vehicle, etc.).

The preferred embodiments could also be applied with minor modifications to terrestrial networks where the mobile platform (car, truck, bus, train, ship, etc.) uses a directional antenna. Such an implementation will now be described in connection with FIGS. 15 and 16. FIG. 15 illustrates a land based vehicle, in this example a passenger train 80. The train 80 includes an antenna system 82 mounted on a roof portion. Antenna system 80 in this example comprises a phased array antenna functionally identical to phased array antenna system 32, except that the radiating elements are adapted to be supported such that they extend upwardly rather than downwardly as in FIG. 3b, so that the antenna pattern is formed in the upper rather than lower hemisphere. The train 80 carries an antenna controller 84, a navigation system 86 a beam forming network 88, a server/router 90 and a transceiver 92. Components 84, 88, 90 and 92 operate in the same manner as components 24, 28, 22 and 30, respectively, of the embodiment described in connection with FIG. 1. Navigation system 86 may only need to monitor the heading of the train 80 (i.e., in one dimension, that being in the azimuth plane), if it is assumed that the train will not experience any significant degree of pitch and roll, and will not be operating on significant inclines or declines that would significantly affect the pointing of its fixedly mounted phased array antenna system 82. This is also in part because of the relatively wide beam pattern which typically is in the range of about 30 degrees-60 degrees. This would be expected with a mobile platform such as a passenger train or other mobile land or marine vehicle. In this implementation, a simple electronic compass may suffice to provide the needed heading information.

With a smaller, more maneuverable mobile platform such as a van, for example, it might alternatively be assumed that more significant pitch and roll of the vehicle will be experienced during operation, as well as travel over topography having significant inclines or declines. In that instance, the navigation system 86 would preferably include angular rate gyroscopes or similar devices to report the vehicle's instantaneous orientation to the antenna controller 84 so that more accurate beam pointing can be achieved. In either event, however, a land based vehicle is expected to present less challenging beam pointing because the great majority of pointing that will be needed will be principally in the azimuth plane.

Figure 16:
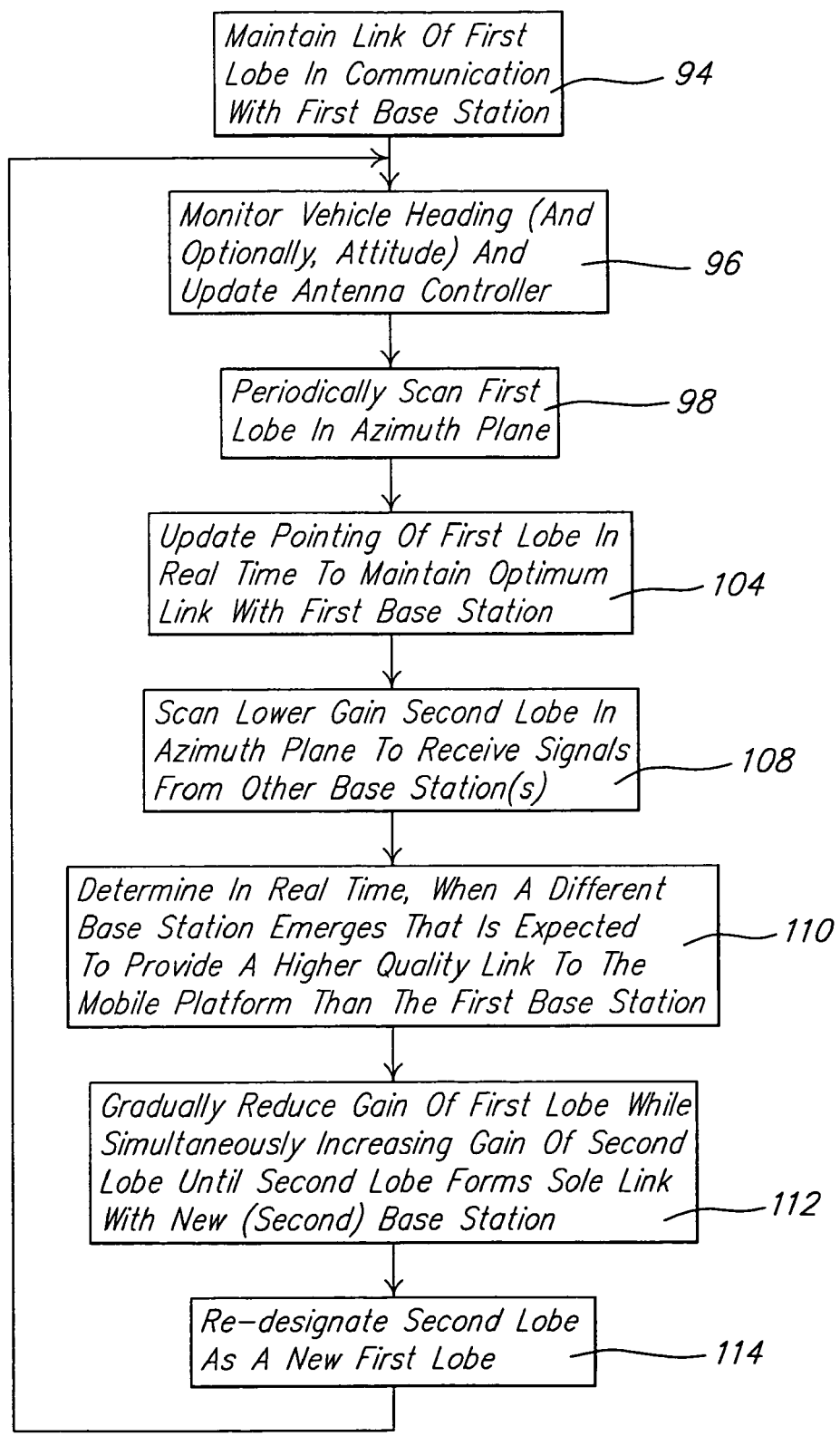
FIG. 16 is a flow chart illustrating the operations performed by the system in FIG. 15 in making a soft handoff from a first BTS site to a second BTS site.

With reference to FIGS. 15 and 16, it will be assumed that a cellular communications link is established with a first BTS site 36a (operation 94 in FIG. 16). As the train 80 travels, the navigation system 86 periodically checks the heading (and optionally the attitude) of the train, for example every 30 seconds, and updates the antenna controller 84 in real time, as indicated at operation 96. At operation 98, the antenna controller 84 controls the beam forming network 88 so that a first lobe 100a of a beam from antenna system 82, having a first gain, is scanned about a limited arc in the azimuth plane, as indicated by dashed line 102. The antenna controller and the beam forming network 88 are used to modify the pointing of the first lobe 100a in real time as needed to maintain the first lobe 100a pointed at the first BTS 36a, and thus to maximize the quality of the link with first BTS site 36a, as indicated at operation 104.

While the train 80 is traveling, the antenna controller 84 controls the beam forming network 88 to generate a second lobe 100b (represented by stippled area) from the beam from the antenna system 82, that preferably has a lesser gain than lobe 100a. Lobe 100b is continuously scanned about a predetermined arc in the azimuth plane as indicated by arc line 106 in FIG. 15. The second lobe 100b is used to receive RF signals in real time from one or more different BTS sites 36b and 36c shown in FIG. 15 (i.e., BTS sites within arc line 106), as also indicated in operation 108 (FIG. 16), that may be available to form a higher quality link with. In this regard, the second lobe 100b is used to continuously "hunt" for a different BTS site that may be available, or about to become available within a predetermined short time, that would form a higher quality link than the link with BTS site 36a.

At operation 110 in FIG. 16, the antenna controller 84 uses a suitable algorithm that takes into account the signal strength of the signals received from different BTS sites 36b and 36c, as well as the heading of the train 80, to determine in real time if a new BTS site has emerged that provides a higher quality link than the existing line with BTS site 36a, or which is expected to provide a higher quality link within a predetermined time. If the locations of all the BTSs are known and listed in a look-up table, then the second beam can be directly pointed in the direction of the BTS which will shortly become the closest. If BTS location data is not known a priori, the second beam would operate in a search mode, being swept across a specified angular sector until a valid signal from the new BTS is acquired. The algorithm is executed repeatedly as RF signals are received via the second lobe 100b. In this example, the train 80 is leaving the coverage cell formed by BTS site 36a and moving in the coverage cell provided by BTS site 36b. Accordingly, BTS site 36b thus forms the next site that a handoff will be made to. At operation 112, a soft handoff is effected from BTS site 36a to BTS site 36b by gradually reducing the gain of the first lobe 110a while the gain of the second lobe 110b is gradually increased. The link with BTS site 36a is thus gradually broken while a new (i.e., sole) communications link is formed with BTS site 36b. After this occurs, the second lobe is re-designated as the primary (i.e., "first" lobe) by the antenna controller 24, as indicated at operation 114, and the sequence of operations 96, 98, 104, 108, 110, 112 is repeated. In the present example, the link with BTS site 36b will be maintained until the train 80 gets sufficiently close to BTS site 36c, at which time a soft handoff will be commenced pursuant to the operations of FIG. 16 to transfer the communications link from BTS site 36b to BTS site 36c.

From the foregoing description, it will also be appreciated that while the term "aircraft" has been used interchangeably with the generic term "mobile platform," the system and method of the present invention is readily adapted for use with any airborne, land-based, space-based or sea-based vehicle or platform, and can be applied to any cellular communication network.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An antenna system of a mobile platform for communicating with first and second base stations comprising:
   an antenna aperture;
   a beam former for controlling the antenna aperture to generate a single beam having first and second lobes, said first lobe being used to form a first communications link with said first base station and said second lobe being used to form a second communications link with a second base station;

an antenna controller for controlling the beam former to enable steering at least one of the two lobes in a desired direction by adjusting an array phase distribution of signals being communicated via said antenna aperture;

the phase distribution of signals for the first and second lobes being accomplished by the beam former determining a plurality of complex voltage distributions required to steer one beam in a corresponding plurality of predetermined directions, and modifying each of the complex voltage distributions by a blending factor, where the sum of the blending factors used is no greater than 1; and said antenna controller adapted to control said beam former so that said lobes are controlled to effect a communications handoff from one to the other of said base stations.

2. The antenna system of claim 1, the antenna controller further controlling the two lobes by adjusting both the array phase distribution and the array amplitude distribution of said signals.

3. The antenna system of claim 1, further comprising a full duplex transmit/receive subsystem.

4. The antenna system of claim 1, further comprising a transmit subsystem for generating a transmit signal.

5. The antenna system of claim 3, the antenna aperture comprising a phased array antenna aperture including a plurality of antenna elements; and the beam former comprising elements to control the lobes by adjusting the array phase distribution and array amplitude distribution of said signals communicated via said antenna aperture.

6. A method for generating a single beam having at least a pair of lobes for use with an antenna, the method comprising:

using an antenna to generate a single beam having a pair of independent lobes each forming an independent communications link with a pair of remotely located base stations;

using a beam former to control an array phase distribution and an array amplitude distribution of signals applied to said antenna that are used to form at least one of the lobes, to thus steer said one lobe in a desired direction independently of the other said lobe;

the phase distribution of signals for the lobes being accomplished by the beam former determining a plurality of complex voltage distributions required to steer one beam in a corresponding plurality of predetermined directions, and then modifying each of the complex voltage distributions by a blending factor, where the sum of the blending factors used is no greater than 1; and further controlling said lobes so that a communications handoff is made from a first one of said pair of base stations to a second one of said pair of base stations.

7. An antenna system for use in communicating with a terrestrial network, where a communications handoff is required to be made by the antenna system from communication with a first base transceiver station (BTS) to communication with a second BTS, the system comprising:

an antenna controller having information as to the location of the first and second BTSs;

an antenna component adapted to be carried by a mobile platform;

a beam forming network responsive to the antenna controller for controlling signals communicated via said antenna component to radiate a single antenna beam having a first lobe having a first gain, and a second lobe having a second gain, with the first and second lobes being independently steerable in desired directions, and with the first and second gains being controllable;

a phase distribution of signals for the first and second lobes further being accomplished by the beam forming network determining a plurality of complex voltage distributions required to steer one beam in a corresponding plurality of predetermined directions, and modifying each of the complex voltage distributions by a blending factor, where the sum of the blending factors used is no greater than 1; and the lobes being steerable to enable simultaneously establishing two independent communication links with said BTSs, the BTSs being located at spaced apart locations within two overlapping coverage regions, so that a handoff from the first BTS to the second BTS can be made.

8. The antenna system of claim 7, the antenna component comprising a phased array antenna having a plurality of antenna elements.

9. The antenna system of claim 8, wherein said antenna system further includes a plurality of diplexers, one said diplexer for each said antenna element, for interfacing said beam forming network to said antenna elements.

10. The antenna system of claim 8, said phased array antenna comprising a plurality of monopole blade antenna elements adapted to be mounted closely adjacent one another on an exterior surface of said mobile platform.

11. The antenna system of claim 8, said beam forming network including a transmit beam forming subsystem and a receive beam forming subsystem.

12. The antenna system of claim 11, said receive beam forming subsystem including a plurality of phase shifters and signal attenuators responsive to signals from the antenna controller for controlling an array distribution pattern in both phase and amplitude across said antenna elements.

13. The antenna system of claim 12, the receive beam forming subsystem including a plurality of low noise amplifiers, with one each of said low noise amplifiers being associated with each of said antenna elements.

14. The antenna system of claim 13, further comprising a receiver-combiner that interfaces said receive beam forming subsystem to an external transceiver.

15. The antenna system of claim 11, said transmit beam forming subsystem including a plurality of phase shifters, one each of said phase shifters being associated with each said antenna element, for controlling a phase of signals applied to said antenna elements.

16. A method for generating at least two independently steerable beam lobes from a single antenna beam of a phased array antenna, comprising:

using a beam former to:
determine complex voltage distributions needed to steer a single beam in each one of a plurality of predetermined directions;
calculate a complex voltage distribution needed to generate the plurality of lobes from the single antenna beam by:
a) multiplying each said complex voltage distribution by $(1-\alpha)$, where $\alpha$ is a predetermined blending factor having a value between 0 and 1, and such that the sum of the blending factors used is no greater than 1; and
b) adding together the products of a).

17. The method of claim 16, further comprising using the complex voltage distribution to generate a plurality of complex weight settings to be applied to each said element of the antenna array, wherein each said weight setting comprises both an amplitude value and a phase value.

18. The method of claim 17, further comprising normalizing a distribution of the amplitude values to be applied to each said element of said phased array antenna by determining a maximum amplitude value present from all of said amplitude values, and subtracting the maximum amplitude value from each of said amplitude values to produce a plurality of normalized amplitude values.

19. The method of claim 18, further comprising applying the normalized amplitude values and the phase values of each said signal to the elements of the phased array antenna.

20. The method of claim 16, wherein said using a beam former to determine complex voltage distributions comprises determining phase distribution values for signals to be applied to said elements of said phased array antenna, needed to steer a single beam in each of the plurality of predetermined directions.

21. The method of claim 16, wherein the operation of determining complex voltage distributions needed to steer a single beam in each one of a plurality of different directions comprises determining amplitude distribution values for signals to be applied to said elements of said phased array antenna.

22. A method for generating two independently steerable lobes from a single beam of a phased array antenna, in which the phased array antenna has a plurality of independent antenna elements, comprising:
using a beam former to:
  a) define a fixed amplitude distribution;
  b) determine a phase distribution needed to steer a single beam in a first direction;
  c) use the amplitude distribution from operation a) and the phase distribution from operation b), to determine a complex voltage distribution needed to steer a single beam in the first direction;
  d) determine a phase distribution needed to steer a single beam in a second direction;
  e) use the amplitude distribution from operation a) and the phase distribution from operation d), to determine a complex voltage distribution needed to steer a single beam in the second direction;
  f) calculate the complex voltage distribution needed to form dual lobes from the single beam by multiplying the complex voltage distribution determined from operation c) by a blending factor $(1-\alpha)$, and adding a quantity: $(1-\alpha) \times$(the voltage distribution at operation e); and
  g) using the information obtained from operation f), generating an amplitude value and a phase value to be applied to each element of the phased array antenna to generate two lobes aimed in desired directions, from the single beam of the phased array antenna.

23. The method of claim 22, further comprising altering the blending factor $\alpha$ between values of zero and one to control the gain of each of the two lobes of the single antenna beam.

24. The method of claim 22, operation g) further comprising normalizing the amplitude distribution of the amplitude values applied to all of the elements of the phased array antenna.

25. The method of claim 24, wherein the normalizing operation comprises determining a maximum amplitude value, in decibels, obtained at operation g), subtracting the determined maximum amplitude value from the amplitude values obtained at operation g) to produce a plurality of normalized amplitude values, and applying the normalized amplitude values to the elements of the phased array antenna.

26. A method for generating two independently steerable lobes from a single beam of an antenna, comprising:
using a beam former to:
  a) calculate a phase distribution needed to steer a single beam from a plurality of elements of said antenna in a first direction;
  b) using a baseline, fixed amplitude distribution for said antenna, together with said calculated phase distribution of operation a), calculate a complex voltage distribution needed to steer a single beam in said first direction;
  c) calculate a phase distribution needed to steer a single beam from said phased array antenna in a second direction different than said first direction;
  d) using the fixed amplitude distribution from operation b), and the phase distribution calculated at operation c), calculate a complex voltage distribution needed to steer the single beam in the second direction;
  e) calculate a complex voltage distribution needed to form a blended dual beam by multiplying the complex voltage distribution obtained from operation b) by a value $(1-\alpha)$, and adding $(1-\alpha)$ times the complex voltage distribution from operation d);
  f) apply the calculation of operation e) to each said element of the antenna;
  g) using the complex blended dual beam distribution from operations e) and f), convert the complex voltage value at each said antenna element to an amplitude value and a phase value;
  h) determine a maximum amplitude value across the elements of the antenna;
  i) subtract the maximum amplitude value obtained at operation h) from the amplitude value at each of the elements of the antenna obtained at operation g) to thus normalize the amplitude distribution across the elements; and
  j) apply amplitude values from operation i) and phase values from operation g) to said electronically adjustable attenuators and phase shifters associated with each said element of the antenna to generate the lobes of the single antenna beam.

27. An aircraft comprising:
an antenna system for use in communicating with a terrestrial network, where a communications handoff is required to be made by the antenna system from communication with a first base transceiver station (BTS) to communication with a second BTS, the system comprising:
an antenna controller having information as to the location of the first and second BTSs;
an antenna component adapted to be carried by said aircraft;
a beam forming network responsive to the antenna controller for modifying signals applied to said antenna component to cause said antenna component to radiate a single beam having:
a first lobe,
selectively a second lobe, with the first and second lobes being independently steerable and controllable to simultaneously establish two communication links with said BTSs, and to effect a handoff of communications with the first BTS to the second BTS; and
a phase distribution of signals for the first and second lobes being accomplished by the beam forming network determining a plurality of complex voltage distributions required to steer one beam in a corresponding plurality of predetermined directions, and modifying each of the complex voltage distributions by a blending factor, where the sum of the blending factors used is no greater than 1.

28. The aircraft of claim 27, the beam forming network further comprising gain control to control a gain of each of said lobes.

* * * * *